United States Patent [19]

Ando

[11] Patent Number: 4,631,395
[45] Date of Patent: Dec. 23, 1986

[54] OPTICAL APPARATUS FOR DETECTING THE FOCUSING STATE AND POSITIONAL ACCURACY OF A LIGHT BEAM DIRECTED ONTO AN OPTICAL DISK TRACKING GUIDE IN AN OPTICAL READ/WRITE SYSTEM

[75] Inventor: Hideo Ando, Tokyo, Japan

[73] Assignee: Tokyo Shibaura Denki Kabushiki Denki, Kawasaki, Japan

[21] Appl. No.: 817,259

[22] Filed: Jan. 8, 1986

Related U.S. Application Data

[63] Continuation of Ser. No. 416,694, Sep. 10, 1982, Pat. No. 4,585,933.

[30] Foreign Application Priority Data

Sep. 17, 1981 [JP] Japan .................. 56-146540
Sep. 17, 1981 [JP] Japan .................. 56-146542
Sep. 17, 1981 [JP] Japan .................. 56-146543
Oct. 22, 1981 [JP] Japan .................. 56-168966
Oct. 22, 1981 [JP] Japan .................. 56-168969

[51] Int. Cl.$^4$ ............................................. G11B 7/00
[52] U.S. Cl. .................................... 250/201; 369/45
[58] Field of Search .............. 250/201, 204; 369/44, 369/45, 46; 358/342

[56] References Cited

U.S. PATENT DOCUMENTS 4,425,636  1/1984  Musha et al. ............. 250/201 DF
4,455,085  6/1984  Kato et al. ................ 250/201 DF Primary Examiner—Edward P. Westin
Attorney, Agent, or Firm—Cushman, Darby & Cushman

[57] ABSTRACT

Optical apparatus for controlling the focusing and positional accuracy of a light beam incident on an optical disk tracking guide in an optical read/write system. Laser beams are converged by an objective lens and directed onto the tracking guide to form a beam spot. Light reflected from the tracking guide is reconverged by the objective lens and directed toward a light shielding plate. The reflected light contains an image of the beam spot and diffraction patterns within the beam spot image which are caused by light reflected from the tracking guide. The plate allows only a portion of the reconverged light beam to pass, a portion which is displaced from the optical axis of the beam. The passed portion is converged by a projection lens and passed to a cylindrical lens. The beam spot image in the light passing through the cylindrical lens will become elongated. This light is directed to a photosensitive surface having a plurality of signal producing photosensitive regions. When the light beam is in focus and on track on the tracking guide, the elongated beam spot falls substantially equally between two of the photosensitive regions, and the diffraction patterns fall substantially in the center of the elongated beam spot image. If either the focusing or positional accuracy of the light beam is off, the photosensitive regions will generate signals which can be used to change the focus or position of the light beam with respect to the tracking guide.

2 Claims, 46 Drawing Figures

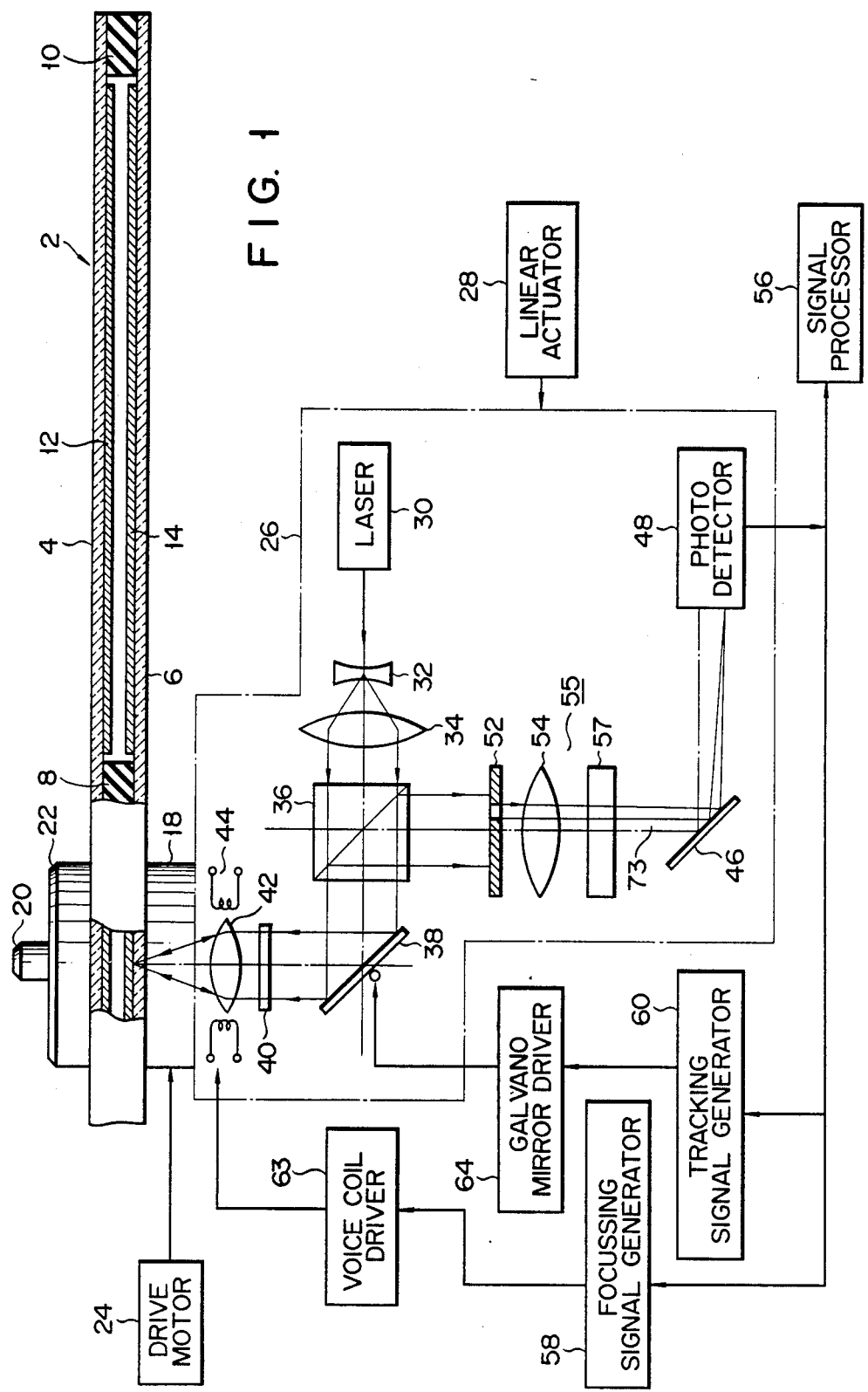

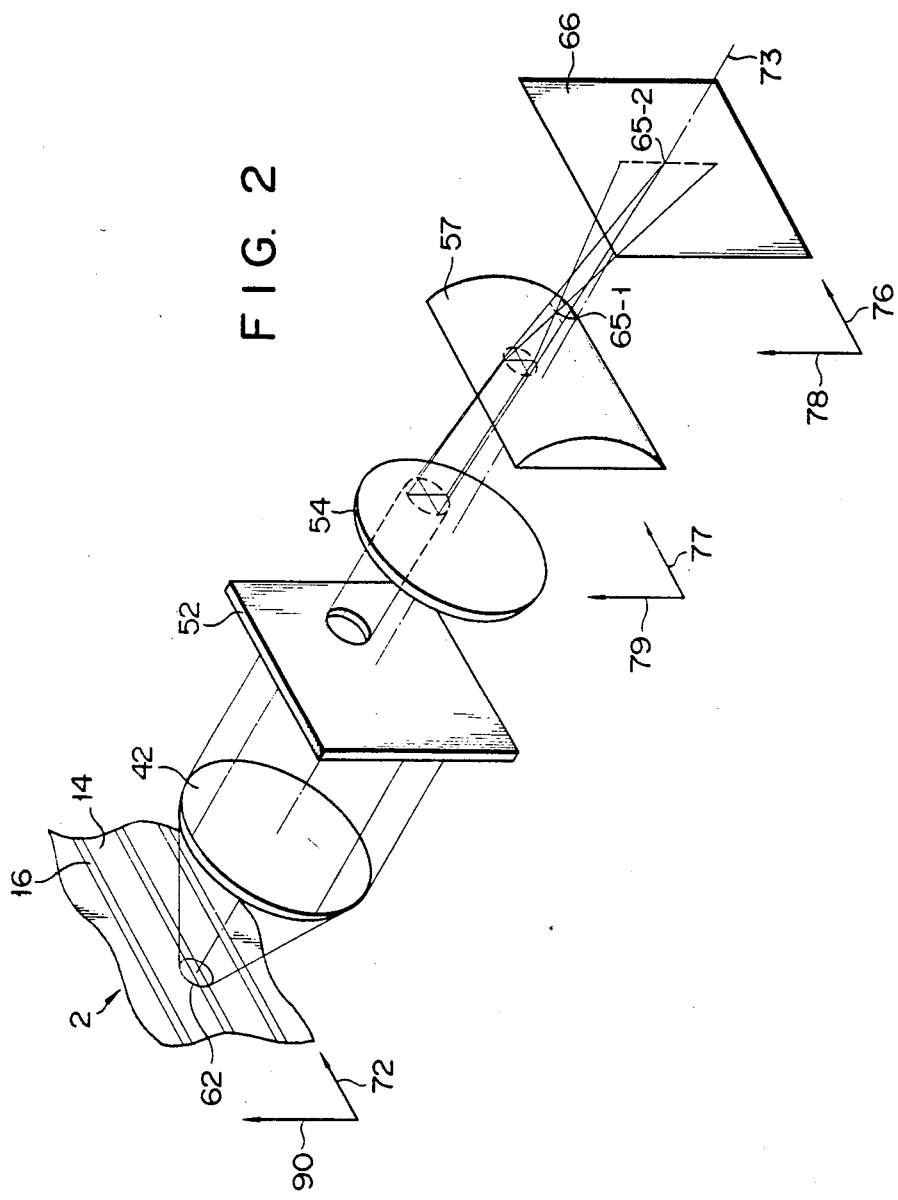

F I G. 16A
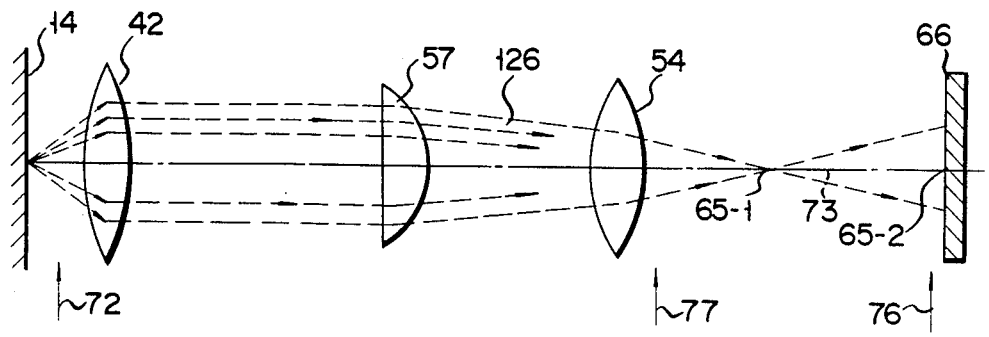
F I G. 16B
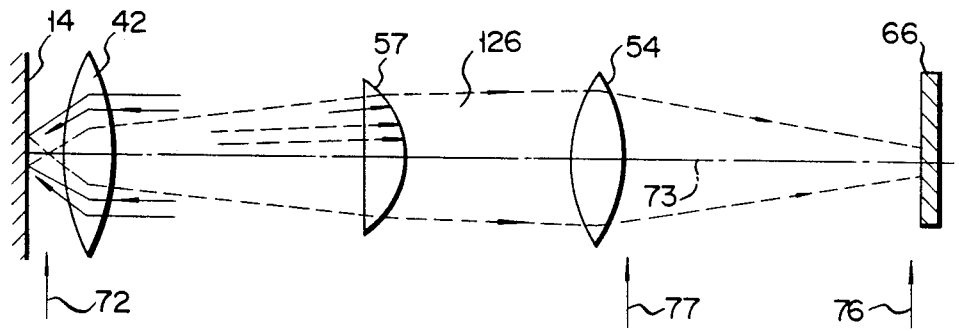
F I G. 16C
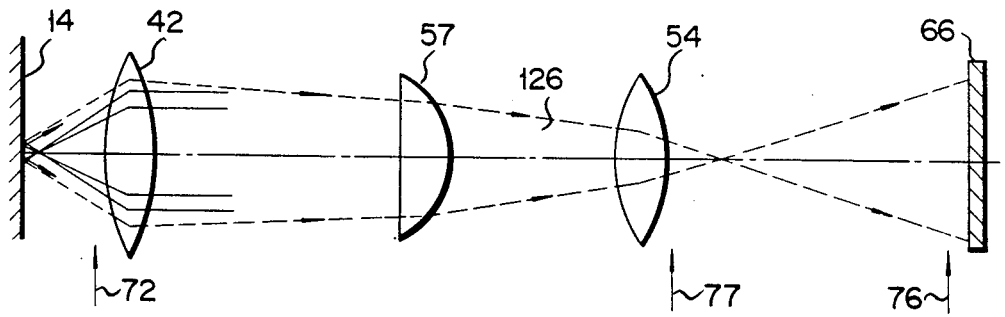

OPTICAL APPARATUS FOR DETECTING THE FOCUSING STATE AND POSITIONAL ACCURACY OF A LIGHT BEAM DIRECTED ONTO AN OPTICAL DISK TRACKING GUIDE IN AN OPTICAL READ/WRITE SYSTEM

This is a continuation, of application Ser. No. 416,694, filed Sept. 10, 1982, now U.S. Pat. No. 4,585,933.

BACKGROUND OF THE INVENTION

The present invention relates to optical method and apparatus for reading from and/or writing information on an information recording and/or reproducing medium such as an optical disk and, more particularly, to optical method and apparatus for detecting the focusing state and positional accurancy of a light beam directed onto an optical disk tracking guide in an optical read/write system.

In an optical system which reads out from or writes information on an information recording and/or reproducing medium, a laser beam is projected onto the information recording and/or reproducing medium (to be referred to as an optical disk hereinafter) through an optical head. The laser beam is reflected from the optical disk and is picked up by the optical head. In order to write information on the optical disk and read it out therefrom properly, the focal point of an objective lens of the optical head must be accurately placed on the light-reflecting surface of the optical disk. In other words, the beam waist of the laser beam converged by the objective lens must be projected onto the optical disk. Various apparatuses have been developed to detect the defocusing state or out-of-focus state of the objective lens. However, these apparatuses are unsatisfactory. For example, an apparatus which utilizes the difference between sizes of focused and defocused beam spots on the optical disk is proposed wherein different patterns of focused and defocused beam spots are projected onto a photodetector and are detected by the photodetector to control proper focusing. Further, a laser beam focusing apparatus which is provided with a lens system combining a conves lens and a cylindrical lens is disclosed in U.S. Pat. No. 4,079,247 of Bricot et al. In the above-mentioned apparatuses, if minute recesses or projections are formed on the optical disk, a diffraction pattern is formed in the beam spot pattern on the photodetector, resulting in erroneous operation. In an optical disk which has a tracking guide to increase information recording capacity, a diffraction pattern of the tracking guide is formed in the beam spot pattern on the photodetector when the beam spot is formed on the tracking guide. As a result, the apparatus may be erroneously operated.

In the apparatuses described above, the defocusing state of the objective lens is detected by changes in the size of the beam spot pattern on the photodetector or by the shape of the beam spot pattern. Another apparatus is proposed which detects the defocusing state of the objective lens by the location of a beam spot pattern formed on a photodetector. In this apparatus, a laser beam for detecting the defocusing state of the objective lens is incident on the objective lens and parallel to an optical axis of the objective lens and projected onto the optical disk through the objective lens. This laser beam is provided in addition to laser beams which are used for readout and writing of information. However, this apparatus has a drawback that the optical system becomes complex and the apparatus is manufactured at high cost, because an optical system having at least two optical paths for the laser beams is required. Other apparatuses are disclosed in Japanese Patent Disclosure No. 53-28405 and 53-10407, respectively. In these apparatuses, laser beams for reading out and writing information are not transmitted on an optical axis of an objective lens but are transmitted in parallel to the axis. However, in these apparatuses the laser beams cannot be sufficiently converged by the objective lens, and a sufficiently small beam spot cannot be formed on the optical disk. Further, since the laser beams pass through the outer peripheral portion of the objective lens and are projected onto the optical disk, the intensity of the laser beams projected onto the optical disk is decreased by eclipse.

Further, an apparatus is disclosed in Japanese Patent Disclosure No. 53-118103, in which a prism is arranged in an optical path of laser beams which have been reflected by an optical disk. In this apparatus, the intensity of the laser beams may attenuate when they pass through the prism, and unwanted diffraction may occur.

Although the various aforementioned drawbacks are peculiar to the optical system of an optical head, the inventor hereof has revealed that the photodetector provided in the system for detecting the defocusing state of the objective lens also involves a problem to be solved. In the conventional optical head, a diffraction pattern appears in the beam spot on the light receiving surface of the photodetector due to smaller projections or recesses on the light-reflecting surface and to dirt and defects on the optical disk and in the optical system. Due to the diffraction pattern, the photodetector judges the objective lens as being in the defocusing state in spite of the fact that the objective lens is in the in-focus of the just focusing state, there being a possibility that a focusing signal will be generated. As a result, it is not possible in the conventional optical head to correctly detect the just focusing state.

SUMMARY OF THE INVENTION

It is therefore, an object of the present invention to provide an optical system for accurately detecting the focusing state of an objective lens.

It is another object of the present invention to provide an optical system which accurately detects the just focusing state of the objective lens and which simultaneously and accurately traces a tracking guide on the optical disk. According to this invention, there is an optical head for focusing a light beam on a light-reflecting surface, comprising:

means for generating a light beam;

means for transferring the light beam;

an objective lens which converts the transferred light beams into a convergent light beam with a beam waist, projects the light beam on the light-reflecting surface and converges divergent light beams which have been reflected from the light-reflecting surface;

an astigmation lens system for converging the light beam incident through the objective lens;

means for deflecting the light beam from the objective lens to the lens system, depending on the distance between the objective lens and the light-reflecting surface; and a photodetector provided with a light-receiving surface so that when the objective lens is at the just focusing state and the beam waist of the convergent light beam projected from the objective lens is formed on the light-reflecting surface, the beam waist image is the first projected pattern formed on the light receiving surface located on the image forming plane by the objective lens and the lens system, and when the objective lens is at the defocusing state and a beam spot larger in size than the beam waist is formed on the light-reflecting surface by the convergent light beam projected from the objective lens, the second projected pattern is larger in size than the beam waist image being formed thereon, the light-receiving surface having at least first and second photosensitive regions which are arranged in a direction in which the pattern is shifted, and when the objective lens changes from the just focusing state into the defocusing state, the first projected pattern on the light-receiving surface is shifted in direction and deformed into the second projected pattern by the deflecting means.

BRIEF DESCRIPTION OF THE DRAWINGS

FIG. 1 is a schematic block diagram of an optical system having an optical head according to one embodiment of the present invention;

FIG. 2 is a perspective view showing a model of the optical system of the optical head shown in FIG. 1;

FIGS. 15A to 15C and FIGS. 16A to 16C are views of the optical paths of the laser beams in the optical system shown in FIG. 13;

DETAILED DESCRIPTION OF THE PREFERRED EMBODIMENTS

Figure 3A:
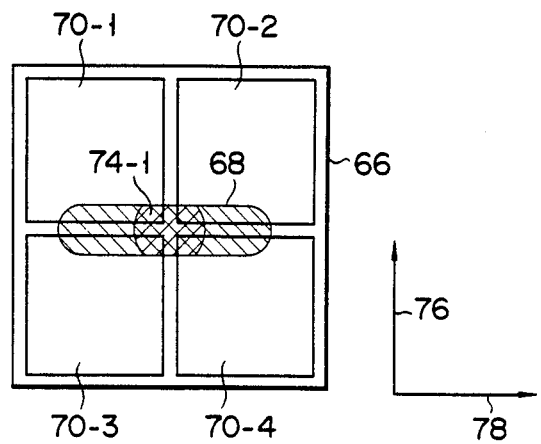
FIG. 3A, 3B and 3C show various patterns formed on a light receiving surface of a photodetector shown in FIG. 2.

In FIG. 1, there is shown an optical system according to this invention in which information is read out from or written on an optical disk 2 which is the information recording and/or reproducing medium. The optical disk 2 comprises a pair of disk-shaped transparent plates 4 and 6 which are held together by inner and outer spacers 8 and 10, as shown in FIG. 1. Light-reflecting layers 12 and 14 are deposited on inner surfaces of the transparent plates 4 and 6, respectively. Circular tracking guides 16 (to be described later) are formed on the light-reflecting layers 12 and 14, respectively, and information or data is recorded in the form of pits on the tracking guide 16. A through hole is formed at the center of the optical disk 2. When the optical disk 2 is placed on a turntable 18, a center spindle 20 of the turntable 18 is fitted into the through hole of the optical disk 2, such that the rotational center of the turntable 18 is aligned with that of the optical disk 2. A chucking element 22 is mounted on the spindle 20 to hold the optical disk 2 on the turntable 18. The turntable 18 is rotatably supported by a support member (not shown) and is driven at a constant speed by a drive motor 24.

The optical system shown in FIG. 1 has an optical head 26 to project a laser beam onto the surface of the light-reflecting layer 14 of the optical disk 2 and to write information on or read it out from the optical disk 2. The optical head 26 is radially movable along the optical disk 2 by a linear actuator 28 and has a laser 30 for generating laser beams. As is known in the art, linear actuator 28 may be controlled by signals from a keyboard or other devices (not shown) in order to effect the scanning of the optical disk in a radial direction. For writing information on the optical disk 2, a laser beam of modulated intensity is generated from the laser 30. For reading out information from the optical disk 2, a laser beam having a predetermined intensity is generated from the laser 30. The laser beam generated from the laser 30 is diverged by a concave lens 32 and converted to a parallel laser beam by a convex lens 34. The parallel laser beam is then transmitted through a beam splitter 36 and is incident on a galvano mirror 38. The laser beam is then reflected by the galvano mirror 38, transmitted through a quarter wave plate 40, converged by an objective lens 42, and projected onto the surface of the light-reflecting layer 14 of the optical disk 2. The objective lens 42 is movably supported by voice coils 44 along an optical axis of the objective lens 42. When the focal point of the objective lens 42 is located on the surface of the light-reflecting layer 14 of the optical disk 2 by activation of the voice coils 44, the smallest beam spot corresponding to the beam waist of the laser beam is formed on the light-reflecting layer 14. Meanwhile, for writing information on the light-reflecting layer 14, pits are formed along the tracking guide on the light-reflecting layer 14 by an intensity-modulated laser beam. Information is recorded in the form of pits on the tracking guide. For reading out information from the light-reflecting layer 14, the light beam is intensity-modulated by the pits formed along the tracking guide.

The laser beam reflected from the light-reflecting layer 14 is guided to the galvano mirror 38 through the objective lens 42 and the quarter wave plate 40. The laser beam reflected by the galvano mirror 38 is incident on the beam splitter 36. Thus, the beam passes through the quarter wave plate 40 twice before it is returned to the beam splitter 36. Therefore, the laser beam returned to the beam splitter 36 is half-phase retarded from the laser beam directed toward the optical disk 2. As a result, the returned laser beam is reflected by the beam splitter 36 and is directed toward a mirror 46. The laser beam is then reflected by the mirror 46 and is incident on the photodetector 48. Thus, an image corresponding to the beam spot on the light-reflecting layer 14 is formed on the photodetector 48. A light-shielding plate 52 having an aperture, and a lens system 55 having astigmation and comprised of a projection lens 54 or convex lens and a cylindrical lens 57 for projecting the laser beams onto the photodetector 48, are arranged between the beam splitter 36 and the mirror 46. The light shielding plate 52 is preferably positioned at the Fourier transform plane determined by the projection lens 54. The aperture of plate 52 is cut at a position away from the intersection of the plate 52 and an optical axis of the lens 54. The plate 52 may have a slit or a knife edge, instead of an aperture. The laser beam is converted into a photoelectric signal by a photodetector 48, and the signal is then processed in a signal processor 56 and converted to digital information or data. The photoelectric signal is also supplied to a focusing signal generator 58 and to a tracking signal generator 60 which respectively generate a focusing signal and a tracking signal after processing of the received signal. The focusing signal is supplied to a voice coil driver 63 to drive the voice coils 44. Thus, the objective lens 42 is moved along the optical axis thereof, and the position of the focal point of the objective lens 42 is adjusted. On the other hand, the tracking signal is also supplied to a galvano mirror driver 64 to adjust the inclination of the galvano mirror 38. As a result, the laser beam is directed toward the tracking guide and the beam spot is accurately positioned along the tracking guide on the light-reflecting layer 14.

The optical elements of the optical system shown in FIG. 1 are arranged as is simply shown in FIG. 2. When the objective lens 42 is at a just focusing state or in focus, the laser beam which passed through this objective lens 42 is converged by it and beam waist 62 is formed on the objective lens 42, i.e. the smallest beam spot is formed on the light-reflecting layer 14. When parallel laser beams come through the objective lens 42, the beam waist 62 is formed at the focal point of the objective lens 42, and when the objective lens 42 is at the just focusing state, the distance between the objective lens 42 and light-reflecting layer 14 is maintained at the focal length of the objective lens 42. When a slightly diverged or converged laser beam is projected through the objective lens 42, the beam waist 62 is not formed at the focal point of the objective lens 42, but is formed in the vicinity of the focal point. The light-receiving surface 66 of the photodetector 48 is located at one of the image-forming points 65-1 and 65-2 so that the image of beam waist 62 may be formed on surface 66 by the objective lens 42, projection lens 54 and cylindrical lens 57. As is well known, the cylindrical lens 57 has a longitudinal and a lateral magnification which differ from each other. A lens system 55 made of a combination of this cylindrical lens 57 and projection lens 54 has a long and a short focal point. As shown in FIG. 2, therefore, the beam waist image is formed on the first- and second-image forming points 65-1 and 65-2, and the light-receiving surface 66 is located at either of the first- and second-image forming points 65-1 and 65-2. When the base line of the cylindrical lens 57 is arranged along the direction 77 as shown in FIG. 2, the light-receiving surface 66 is located at the second-image forming points 65-2, and when the base line of the cylindrical lens 57 is arranged along the direction 79 perpendicular to the direction 77, the light-receiving surface 66 is located at the first image forming point 65-1 nearer to the cylindrical lens 57. More preferably, the base line of cylindrical lens 57 should be arranged along the direction 77 and the light-receiving surface 66 should be located at the second-image forming point 65-2, as shown in FIG. 2, in order to obtain enough precision in the detection of the focusing state and the follow up of the tracking guide. When a parallel laser beam is projected through the objective lens 42 and the beam waist 62 is formed by the objective lens 42 on the light-reflecting layer 14 located at the focal point of said objective lens 42, the image-forming points 65-1 and 65-2 respectively coincide with the short and long focal points of the lens system 55 consisting of the cylindrical lens 57 and projection lens 54. Further the aperture of the light-shielding plate 52 is formed apart from the optical axis 73 in the direction 77. Here the direction 77 is substantially parallel with the direction in which the tracking guide 16 is extending, and the direction 79 is substantially parallel with the direction in which the beam waist 62 is moved in order to trace the tracking guide 16.

Further, the direction 76, in which, as is explained later, the beam waist image is moved on the light-receiving surface 66, is substantially parallel with the direction 77, and the direction 78 in which the pattern or image of the tracking guide 16 moves within the beam waist image on the light-receiving surface 66 is parallel with the direction 79. These directions 72, 76, 77, 78 and 79 are used for explanation purposes only and have no such relationship, as mentioned above, in the optical system shown in FIG. 1 because the optical axis 73 is bent by the galvano mirror 38 and mirror 46. These directions will only have this relationship when, as shown in FIG. 2, the optical elements 14, 42, 52, 54, 57 and 66 are rearranged on a straight optical axis.

The light-receiving surface 66 consists of 4 rectangular photosensitive regions 70-1, 70-2, 70-3 and 70-4 as shown in FIGS. 3A to 3E, and its center is arranged on the optical axis 73. Further, the 4 photo-sensitive regions 70-1, 70-2, 70-3 and 70-4 are arranged with sides parallel to the directions 76 and 78.

Figure 3B:
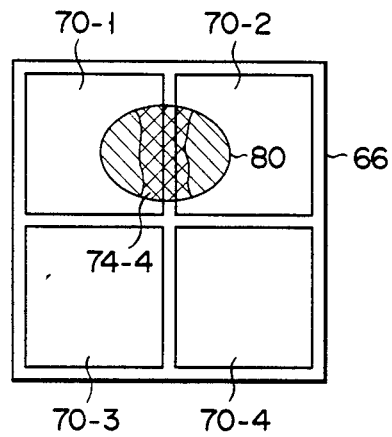
Figure 3C:
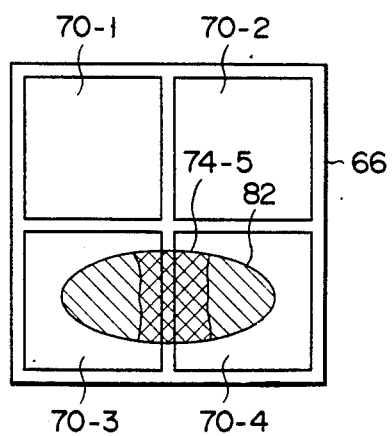
Figure 4A:
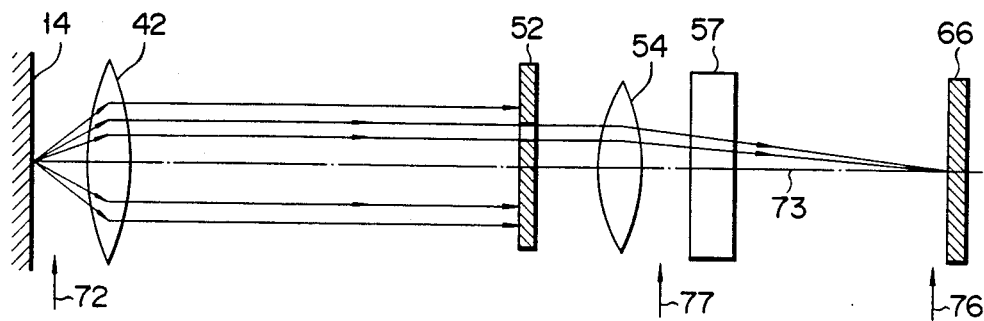
FIGS. 4A, 4B and 4C and FIGS. 5A, 5B and 5C are views depicting the optical paths of the laser beams in the optical system shown in FIG. 2.
Figure 4B:
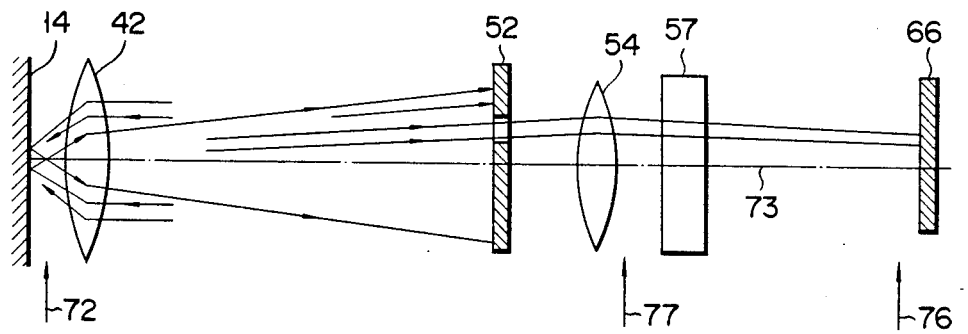
Figure 4C:
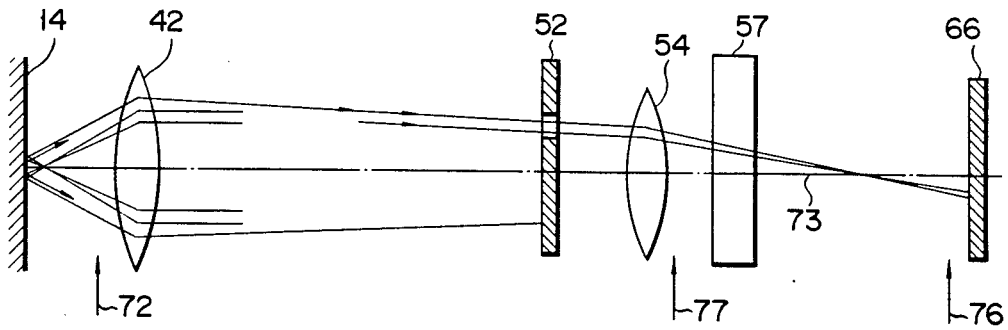
Figure 5A:
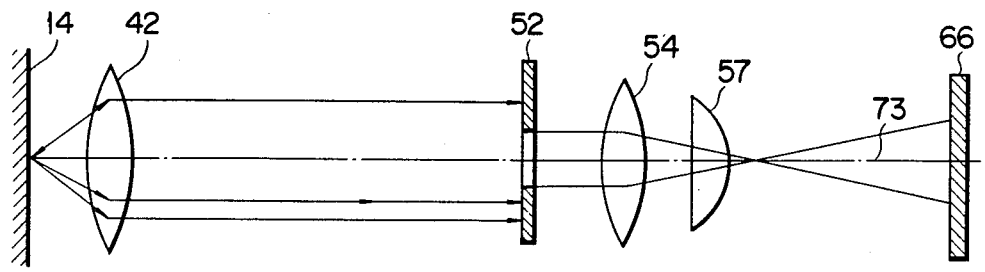
Figure 5B:
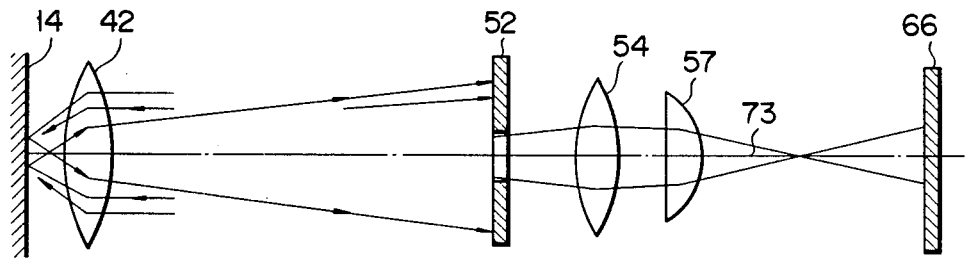

The mode of operation for detecting the just focusing state will be described with reference to FIGS. 3A, 3B, 3C, 4A, 4B, 4C, 5A, 5B and 5C. If the objective lens 42 is in the just focusing state, as shown in FIG. 2, FIG. 4A and FIG. 5A, the beam waist image 68 is formed on the light-receiving surface 66, as shown in FIG. 3A, by the laser beam component passing through the light-shielding plate 52. This beam waist image 68 is not converged in the direction of the base line of cylindrical lens 57, as shown in FIG. 4A, but converged in the direction of the short axis perpendicular to said base line, as shown in FIG. 5A. Thus, beam waist 68 is formed in an elongated elliptical form. If the objective lens 42 comes too close to the light-reflecting layer 14 of the optical disk 2, as shown in FIG. 4B and 5B, a laser beam pattern 80 projected from the projection lens 54 is formed on the photosensitive regions 70-1 and 70-2, as shown in FIG. 3B. In other words, if the objective lens 42 comes too close to the light-reflecting layer 14, the beam waist is formed by the laser beam reflected from the light-reflecting layer 14 and a beam spot whose size is larger than the smallest beam spot is formed on the light-reflecting layer 14. Thus the beam waist is formed between the objective lens 42 and its focal point. Therefore, the laser beam directed from the beam waist to the objective lens 42 is converted to a diverged laser beam by the objective lens 42 and the beam is projected onto the light-shielding plate 52. Since the laser beam component passing through the light-shielding plate 52 is divergent, this component cannot be projected at the center of the light-receiving surface 66 of the photodetector 48 despite being converged by the projection lens 54 and the cylindrical lens 57. The laser beam component is deviated in the direction indicated by the arrow 76 and is projected onto the photosensitive regions 70-1 and 70-2 to form a projected pattern 80. Conversely, as shown in FIG. 4C and 4C, if the objective lens 42 is too far away from the light-reflecting layer 14 of the optical disk 2, a laser beam pattern 82 projected through the projection lens 54 is formed in the photosensitive regions 70-3 and 70-4, as shown in FIG. 3C. In other words, if the objective lens 42 is placed too far away from the light-reflecting layer 14, the divergent laser beam from the beam waist is incident on the light-reflecting layer 14, and a beam spot whose size is larger than the smallest beam spot is formed. The laser beam from this beam spot to the objective lens 42 is converted to a converging laser beam by the objective lens 42 which is directed toward the light-shielding plate 52. The converging laser beam passing through the light-shielding plate 52 is converged by the projection lens 54 and the cylindrical lens 57 to form a beam waist. Thereafter, the beam is diverged again and is projected onto the photosensitive regions 70-3 and 70-4.

Figure 6:
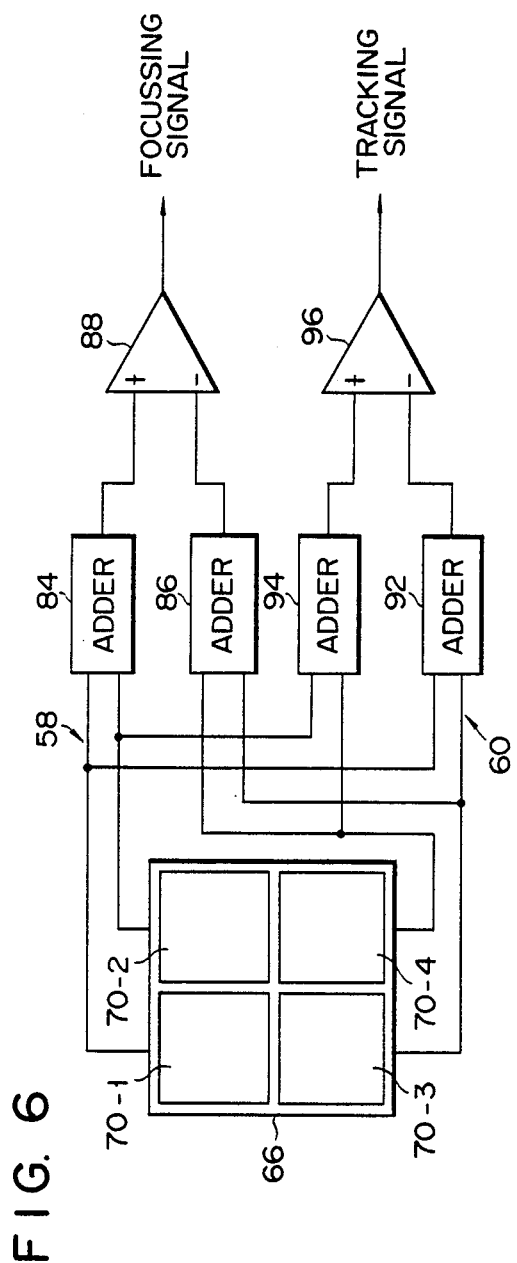
FIG. 6 is a block diagram of a focusing signal generator and a tracking signal generator which are connected to the photodetector shown in FIGS. 3A, 3B and 3C.

As is apparent from the above description, if the objective lens 42 is in the just focusing state, that area of the beam spot image which is formed in the photosensitive regions 70-1 and 70-2 will be equal to that area of the same beam spot image which is formed in the photosensitive regions 70-3 and 70-4, as shown in FIG. 3A. The photoelectric signal level generated from the photosensitive regions 70-1 and 70-2 will be equal to the photoelectric signal level generated from the photosensitive region 70-3 and 70-4. Therefore, in a focusing signal generator 58 shown in FIG. 6, an output signal from an adder 84 connected to the photosensitive regions 70-1 and 70-2 will be at the same level as that from an adder 86 connected to the photosensitive regions 70-3 and 70-4. Thus, a comparator 88 connected to the adders 84 and 86 will not generate any focusing signal. As shown in FIG. 3B, if the projected pattern corresponding to the diffraction pattern of the beam spot is formed on the light-receiving surface 66, a photoelectric signal is generated only by the photosensitive regions 70-1 and 70-2 and the voice coil driver 63 is activated. As a result, the objective lens 42 is moved in the direction away from the optical disk 2 by the voice coils 44. However, as shown in FIG. 3C, if the projected pattern corresponding to the diffraction pattern of the beam spot is formed on the light-receiving surface 66, the objective lens is moved toward the optical disk 2 in response to the focusing signal from the comparator 88.

Figure 7:
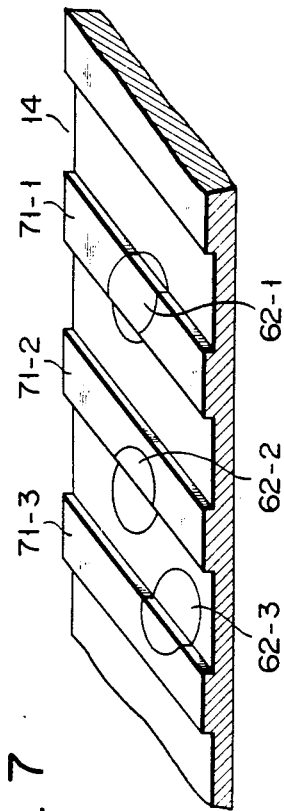
FIG. 7 is a perspective view of laser beam spots formed by the laser beams projected onto a light-reflecting surface of the optical disk.
Figure 8A:
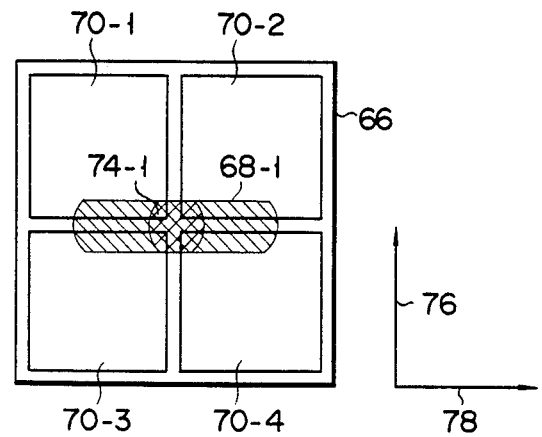
FIGS. 8A, 8B and 8C are plan views of the light-receiving surface of the photodetector, showing images of the tracking guide which are formed in the images of the laser beam spots and diffraction patterns in the tracking guide.
Figure 8B:
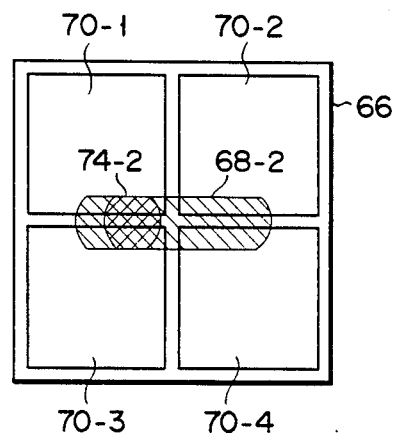
Figure 8C:
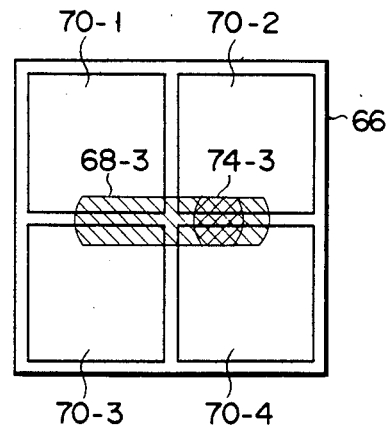

The operation for tracking the tracking guide on the light-reflecting layer 14 of the optical disk 2 with the laser beam, that is, the tracking operation, will be described with reference to FIG. 2, FIGS. 3A to 3C, FIG. 7 and FIGS. 8A to 8C. When the galvano mirror 38 shown in FIG. 1 is inclined, the laser beam reflected from the galvano mirror 38 is also reoriented. A laser beam spot 62 formed on the light-reflecting layer is moved in the direction indicated by the arrow 90 shown in FIG. 2. The beam waist 62 has a diameter larger than a width of the tracking guide 71, see FIG. 7. As shown in FIG. 7 and FIG. 3, if beam waist 62-1 is properly projected onto a tracking guide 71-1, an image 74-1 of tracking guide 71-1 is formed within an image 68-1 of the beam waist 62-1 on the light receiving surface 66 of the photodetector 48, as shown in FIG. 8A. However, if beam waists 62-2 and 62-3 are not properly projected onto tracking guides 71-2 and 71-3, and only parts of the beam waists 62-2 and 62-3 are formed on the tracking guides 71-2 and 72-3, respectively, only parts of images 74-2 and 74-3 of the tracking guides 71-2 and 71-3 are formed in images 68-2 and 68-3 of the beam waists 62-2 and 62-3, respectively, as shown in FIGS. 8B and 8C. If light rays are incident on the tracking guides 71-1 to 71-3, the light rays are diffracted at the edges of the tracking guides 71-1 to 71-3. Therefore, the images 68-1, 68-2 and 68-3 of the tracking guides 71-1, 71-2 and 71-3 are less bright than other image portions in the beam waist images 68-2 and 68-3, resulting in the formation of dark regions. Therefore, as shown in FIG. 8A, when the beam waist 62-1 is properly projected onto the tracking guide 71-1, and the image 74-1 of the tracking guide 71-1 is formed on the light-receiving surface 66, the brightness of the photosensitive regions 70-1 and 70-3 is substantially the same as that of the photosensitive regions 70-2 and 70-4. However, if the beam waists 62-2 and 62-3 are not properly projected onto the tracking guides 71-2 and 72-3 as shown in FIGS. 8B and 8C, and if only parts of the images 74-2 and 74-3 of the tracking guides 71-2 and 71-3 are formed, the brightness of the photosensitive regions 70-1 and 70-3 is not the same as the brightness of the photosensitive regions 70-2 and 70-4. However, when the image 74-1 of the tracking guide 71-1 is properly formed on the light-receiving surface 66, as shown in FIG. 8A, an output signal from an adder 92 connected to the photosensitive regions 70-1 and 70-3 has substantially the same level as an output signal from an adder 94 connected to the photosensitive region 70-2 and 70-4. Thus, no tracking signal is generated from a comparator 96. However, when the image 74-2 of the tracking guide 71-2 is formed on the photosensitive regions 70-2 and 70-4, as shown in FIG. 8B, an output signal level of the adder 94 is lower than that of the adder 92, so that the comparator 96 generates a tracking signal and the laser beam is shifted in the opposite direction to that indicated by the arrow 90 in FIG. 2 by the galvano mirror 38, which is driven by the galvano mirror driver 64. Thus, the beam spot 62 is properly formed on the tracking guide 71. However, if the image 74-3 of the tracking guide 71-3 is formed on the photosensitive regions 70-1 and 70-3, as shown in FIG. 8C, the galvano mirror driver 64 is activated in response to the tracking signal from the comparator 96 such that the laser beam is moved along the direction indicated by the arrow 90 by the galvano mirror 38.

In the optical head shown in FIG. 1, the galvano mirror 38 moves the laser spot in the direction 90 perpendicular to the tracking guide 71. However, the objective lens 42 may be moved, perpendicularly to its optical axis to move the laser beam spot, instead of moving the galvano mirror 38. Alternatively, another mechanism may be employed to move the laser beam spot across the tracking guide 71. In FIGS. 8A to 8C, the images 74-1, 74-2 and 74-3 of the tracking guides 71-1, 71-2 and 71-3 are respectively formed on the light-receiving surface 66 when the objective lens 42 is kept in the just focusing state. However, as shown in FIGS. 3B and 3C, when the projected patterns 80 and 82 are not formed, but diffraction patterns 74-5 of the tracking guide 71 are formed within the projected patterns, respectively. The diffraction patterns 74-4 and 74-5 are darker than other regions in the images of the tracking guides. Therefore, even if the objective lens 42 is not in the just focusing state, it can be detected whether or not the beam spot is properly formed on the tracking guide 71.

As is apparent from the comparison between illustrations in FIGS. 3A to 3C and FIGS. 8A to 8C, movement of the projected pattern in the direction indicated by the arrow 76 allows detection of the focusing state of the objective lens 42. Changes in brightness in the direction indicated by the arrow 78 allow detection of the tracking operation of the light beam along the tracking guide. Thus, focus detection and tracking are independently performed.

Figure 5C:
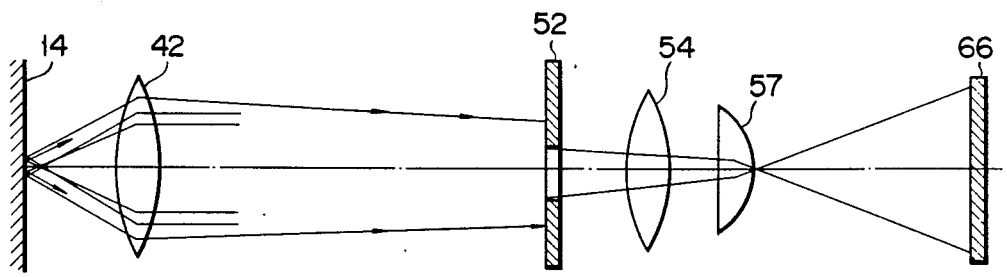
Figure 9A:
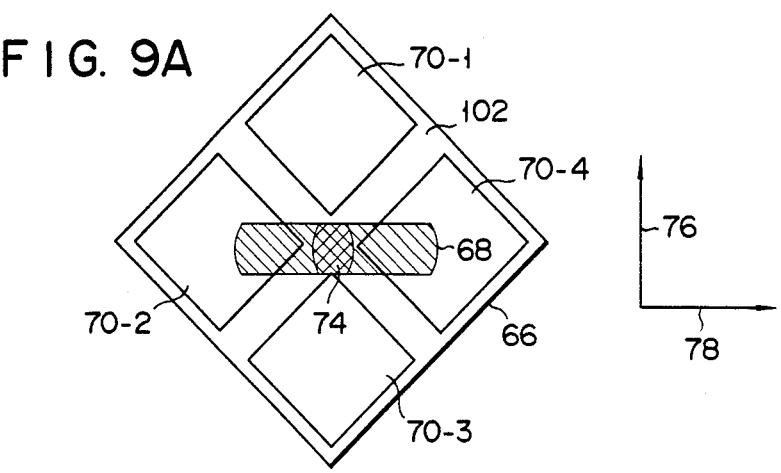
FIGS. 9A, 9B, 9C, 9D and 9E are plan views of a light-receiving surface of a photodetector having photo-sensitive regions whose arrangement is different from that of the light-receiving surface of the photodetector shown in FIGS. 3A to 3C and FIGS. 8A to 8C.
Figure 9B:
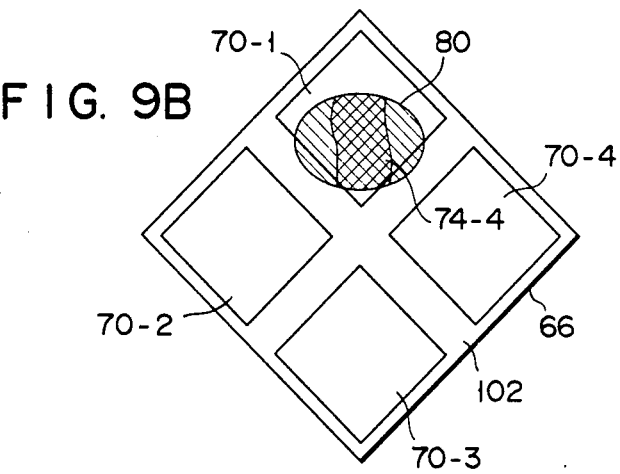
Figure 9C:
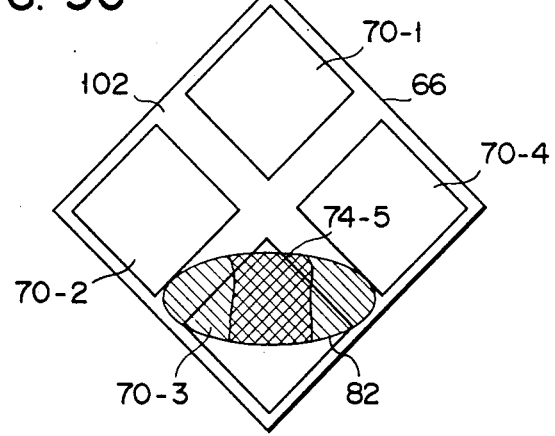

The photosensitive regions 70-1, 70-2, 70-3 and 70-4 of the photodetector 48 may be arranged as shown in FIG. 9A. In this arrangement, the direction indicated by the arrow 76 in which the image 74 of the tracking guide 71 is moved, need not be accurately perpendicular to the direction 78 in which the diffraction patterns 74-4 and 74-5 of the tracking guide 71 or of the image 74 of the tracking guide 71 are moved. Therefore, for arranging the photodetector 48 in the optical system shown in FIG. 1, the light-receiving surface 66 need not be given a highly precise orientation with respect to the optical axis of the projection lens 54. The pair of photosensitive regions 70-1 and 70-3 for detecting the focusing state of the objective lens 42 are arranged along the direction 76 along which the image 68 of the beam spot or the projected patterns 80 and 82 are moved. Similarly, the pair of photosensitive regions 70-2 and 70-4 are arranged in the direction along which the diffraction patterns 74-4 and 74-5, in the projected patterns 80 and 82, or the image 74 of the tracking guide, in the image 68 of the beam spot, are moved. The pair of photosensitive regions 70-1 and 70-3 are connected to a comparator 88 for generating the focusing signal, while the pair of photosensitive regions 70-2 and 70-4 are connected to a comparator 96 for generating the tracking signal. If the light-reflecting layer 14 is too close to the objective lens 42 as shown in FIG. 4B and 5B, the projected pattern 80 shown in FIG. 9B is formed on the light-receiving surface 66. However, if the light-reflecting layer 14 is too far away from the objective lens 42, as shown in FIG. 4C and 5C, the projected pattern 82 shown in FIG. 9C is formed on the light-receiving surface 66. However, if the objective lens 42 is in the just focusing state, the image 68 of the beam waist is formed on the light-receiving surface 66, as shown in FIG. 9A.

Figure 9D:
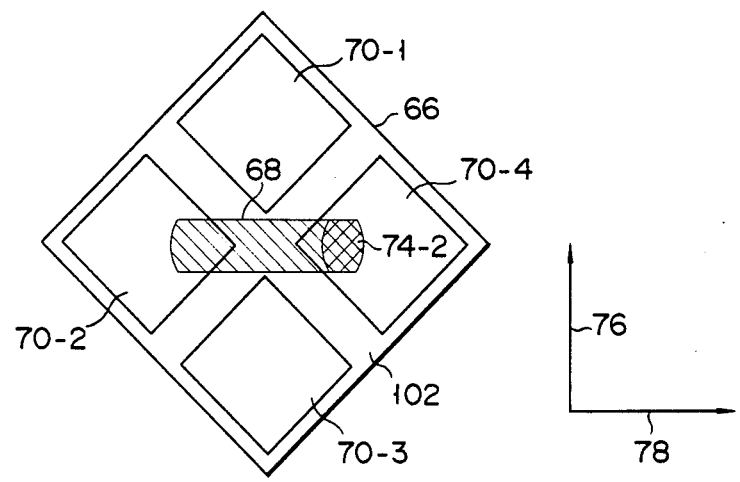
Figure 9E:
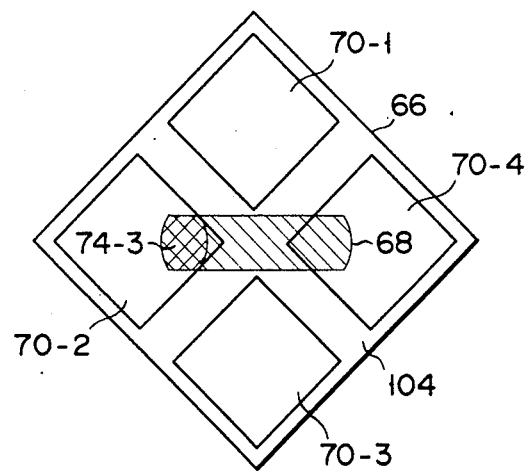
Figure 10:
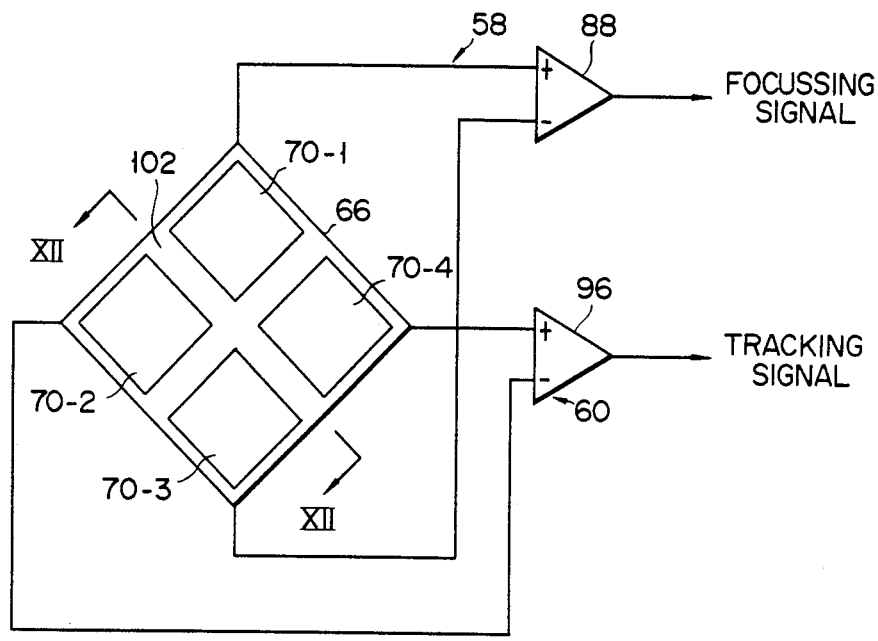
FIG. 10 is a block diagram of a focusing signal generator and a tracking signal generator which are connected to the photodetector shown in FIGS. 9A to 9E.

If the beam spot is deviated from the tracking guide 71, as shown in FIGS. 9D and 9E, the image 74 of the tracking guide 71 or the diffraction patterns 74-4 and 74-5 of the tracking guide 71 are formed predominantly on one of the photosensitive regions 70-2 and 70-4. In response to the focusing signal and the tracking signal from the comparators 88 and 96, respectively, shown in FIG. 10, the objective lens 42 is set in the just focusing state, while the laser beam spot 62 is accurately moved on the tracking guide 71. The images 68 of the beam spots and the projected patterns 74-4 and 74-5 are formed using the light-shielding plate 52 as the slit. As shown in FIGS. 9B and 9C, the projected patterns 74-4 and 74-5, which differ from those shown in FIGS. 3B and 3C, are formed on the light-receiving surface 66.

Figure 11:
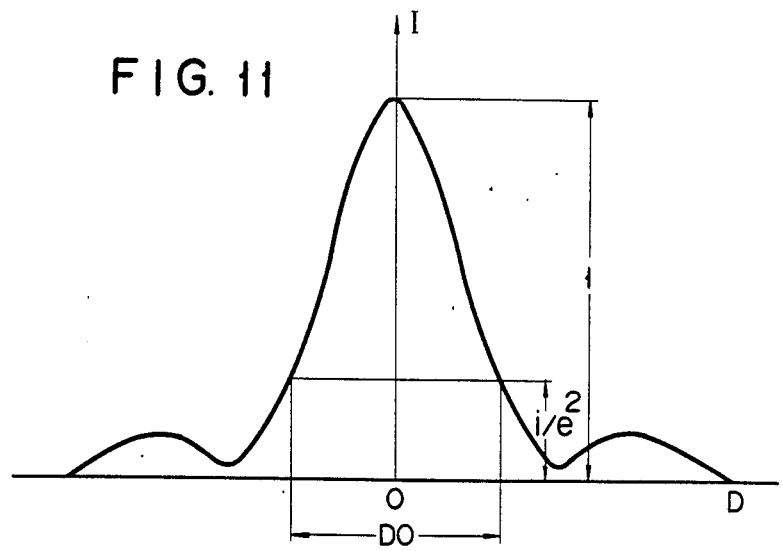
FIG. 11 is a graph illustrating the light intensity of a beam spot image formed on the light receiving surface of the photodetector.
Figure 12A:
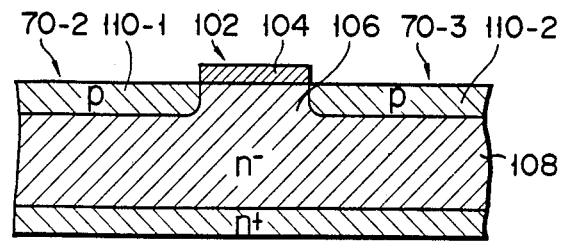
FIG. 12A is a partial sectional view taken along line XIIW—XII of FIG. 10.
Figure 12B:
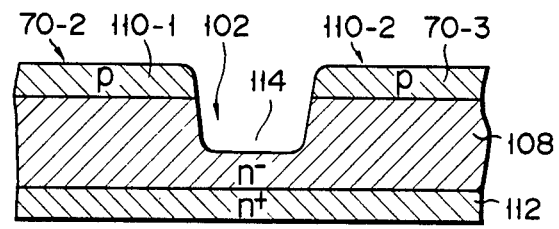
FIGS. 12B and 12C are partial sectional views of a photodetector according to another embodiment.
Figure 12C:
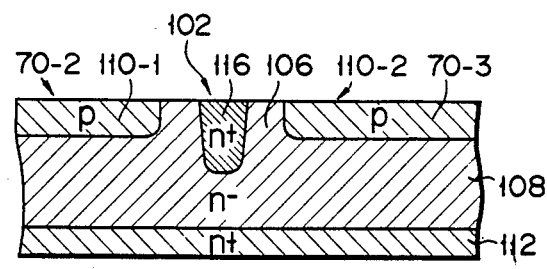

In the light-receiving surface 66, shown in FIG. 9A to 9E and 10, there is preferably formed between the two photosensitive regions 70-1, 70-2, 70-3 and 70-4 a nonphotosensitve region or a photoinsensitive region 102 which senses few or no incident light rays. The width W of the photoinsensitive region 102 between the photosensitive regions 70-1, 70-2, 70-3 and 70-4 is determined to be ¼ or more, preferably ⅜ to 3 times the short width $D_o$ of the elongated image 68 of the beam waist formed on the light-receiving surface 66. Here, the width $D_o$ of the beam waist image 68 is defined as follows. FIG. 11 shows a curve representing light intensity distribution on the light receiving surface 66 of the photodetector 48. In FIG. 11, the ordinate represents an intensity value which takes a unit value or 1 as its maximum, and the abscissa represents distance D from point 0, where point 0 corresponds to the point of maximum beam intensity. In the light intensity distribution curve of FIG. 11, the width $D_o$ is defined as the width of a region in which the intensity is $i/e^2$ or more. The width W of the photoinsensitve region is set to the above-mentioned value, taking into consideration a possible lowering of the optical head's detection sensitivity to the defocusing state and a possible erroneous operation of the optical head. The width W is set normally to 1/1.5 to 1/2.0 of the beam short width $D_o$. In a photodiode, for example, the photoinsensitive region 102 is a surface portion of a substrate between impurity regions which define the photosensitive regions 70-1, 70-2, 70-3 and 70-4. As is generally known, when light rays are projected on the photodiode, most of electrons or holes are produced in a depletion layer in the substrate under the impurity regions, while a few holes or electrons are produced under the surface portion of the substrate between the impurity regions. If the surface portion defining the photoinsensitive region 102 has a width W of ¼ or more of the beam diameter $D_o$, the holes or electrons produced under the surface portion are prevented from drifting into the depletion layer under the impurity regions. Therefore, noise produced in the photodiode is attenuated. As shown in FIG. 12A, an aluminum layer 104 for shielding and reflecting light rays is preferably deposited on a surface portion 106 of the substrate 108 between the two photosensitive regions 70-2 and 70-3. The photodiode shown in FIG. 12A is a PIN type, in which p-type buried regions 110-1 and 110-2 are formed on one surface of the $n^-$-type substrate while an $n^+$-type buried region 112 is formed in the other surface of the $n^-$-type substrate thereof. If light rays are prevented by the aluminum layer 104 from penetrating into the region under the surface portion 106 of the substrate 108, as shown in FIG. 12A, then no holes or electrons will be produced under the surface portion 106, and the noise involved in the signal current from the photosensitive region 70-2 and 70-3 will be attenuated. The noise may be attenuated in like manner by removing the surface portion 106 of the substrate 108 by etching to form a recess 114 between the photosensitive regions 70-2 and 70-3, as shown in FIG. 12B, instead of forming the aluminum layer 104 on the surface portion 106. Also, it is possible to attenuate noise by forming an $n^+$-type isolated layer 116 in the surface portion 106, as shown in FIG. 12C. In the photodiode shown in FIG. 12C, when a reverse-biased voltage is applied to the $n^+$-type isolated layer 116, no depletion layer is produced under the surface portion 106, thereby holes or electrons are prevented from drifting into the depletion layer under the p-type buried regions 110-1 and 110-2.

In the photodetector 48 provided with the photoinsensitive region 102 as shown in FIGS. 9A to 9E, and FIG. 10, the photoelectric signal is not substantially generated from the photosensitive regions 70-1 and 70-3 for detecting focus at the just focusing state as shown in FIG. 9A. Therefore the noise component which may occur from the photodetector 38 at the just focusing state is small enough to detect the just focusing state with accuracy. Moreover in the photodetector 48 provided with this photoinsensitive region 102, as is clear from FIGS. 9A, 9D and 9E, the tracking guide can be followed accurately.

Some modifications of this invention will hereinafter be explained with reference to FIG. 13, FIGS. 14A to 14E, FIGS. 15A to 15C, FIGS. 16A to 16C, and FIG. 17. In the system shown in FIG. 13, arrangements are so made that the light-shielding plate 52 is removed, and the cylindrical lens 57 receives and converges part of the laser beam directed from the objective lens 42 to the projection lens 54, thus lens 57 refracts part of the laser beam and thus is a refracting body. The base line of the cylindrical lens 57 is parallel to the direction 77 as in the optical system shown in FIG. 2. In the optical system shown in FIG. 13, the light-receiving surface 66 has 6 photosensitive regions 120-1 to 120-6 along the direction 76 and 78, see FIG. 14A. When the objective lens 42 is at the just focusing state, the first parallel light beam component 122, which goes directly to the projection lens 66 from the objective lens 42, is converged by the projection lens 54 and directed to the long focal point 65-2, as shown by the solid lines in FIG. 15A. Therefore, a first beam waist image 124-1, with a comparatively high intensity of illumination, is formed on the light-receiving surface 66 located at the long focal point 65-2. Next, the second parallel light beam component 126, which goes from the objective lens 42 to the projection lens 54 through the cylindrical lens 57, is converged by the cylindrical lens 57 and further converged by the projection lens 54, as shown by the broken lines in FIG. 15A. Light beam component 126 proceeds to the short focal point 65-1 and thereafter proceeds to the long focal point 65-2 as shown in FIG. 15A. Therefore, the second beam waist image 128-1 which is lower in brightness and thinner than the first beam waist image 124-1 is formed on the light-receiving surface 66. As shown in FIG. 15B, when the objective lens 42 comes too close to the light reflecting layer 14 and is in the defocusing state, the first diverged light beam component 122 going from the objective lens 42 to the projection lens 54 is not directed to the long focal point 65-2 even after the beam component 122 is converged by the projection lens 54, and, on the light-receiving surface 66, it is deviated from the center and projected on the photosensitive region 120-1 to form a projection pattern 124-2 with a comparatively high intensity of illumination on the photosensitive region 120-3. The second converged light beam component 126 which proceeds from the objective lens 42 to the projection lens 54 through the cylindrical lens 57, as shown by the broken lines in FIG. 15B, is not directed to the short focal point 65-1 and the long focal point 65-2, even after being converged by the cylindrical lens 57 and the projection lens 54 onto the light receiving surface 66. The beam component 26 is deviated from the center and projected on the photosensitive regions 120-2, 120-4 and 120-6 to form a comparatively large elliptical projected pattern 128-2 with relatively low intensity of illumination on the photosensitive region 120-2, 120-4, and 120-6. As shown in FIG. 15C, when the objective lens 42 is too far away from the light-reflecting layer 14 and is in the defocusing state, the first converged light beam component 122, which proceeds from the objective lens 42 to the projection lens 54 is further converged by the projection lens 54, and goes to the convergence point. On the light-receiving surface, the first light beam component 122 diverged from this convergence point is deviated from the center and projected on the photosensitive regions 120-2 to form a projection pattern 124-3 with a comparatively high intensity of illumination on the photosensitive region 120-2. The second converged light beam component 126 which goes to the projecting lens 54 from the objective lens 42 through the cylindrical lens 57, as shown by the broken lines in FIG. 16C, is converged by the cylindrical lens 57 and the projection lens 54 and directed to the convergence point. The second light beam component 126 diverged from the convergence point is deviated from the center on the light-receiving surface 66 and projected on the photosensitive regions 120-1, 120-3 and 120-5 to form a comparatively small elliptical projected pattern 128-3 with a relatively low intensity of illumination on the photosensitive regions 120-1, 120-3 and 120-5.

Figure 14A:
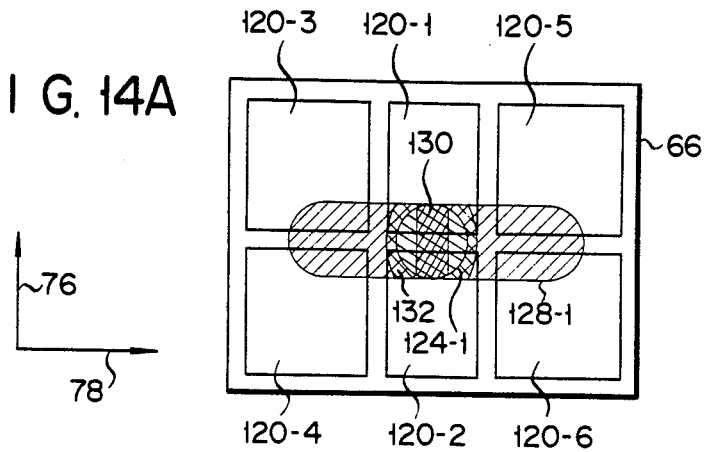
FIGS. 14A to 14E are plan views of a light-receiving surface of a photodetector having photosensitive regions whose arrangement is different from that of light-receiving surfaces of the photodetector shown in FIGS. 3A to 3C, FIGS. 8A to 8C and FIGS. 9A to 9E.
Figure 17:
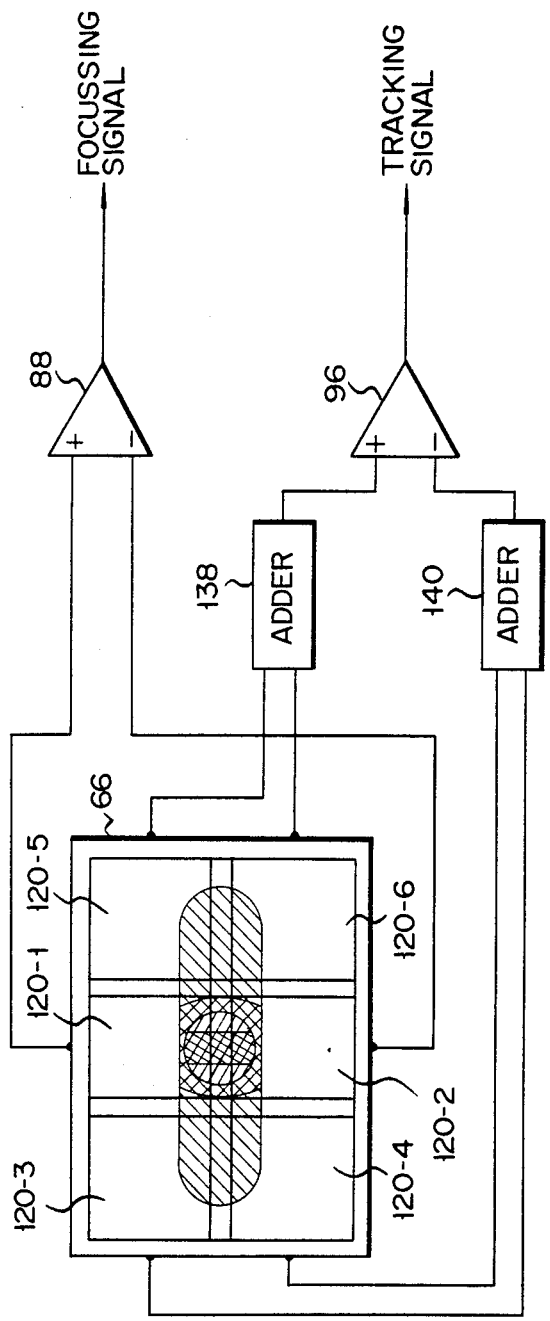
FIG. 17 is a block diagram of a focusing signal generator and tracking signal generator which are connected to the photodetector shown in FIGS. 14A to 14E.

At the just focusing state shown in FIG. 14A, each part of the first and second beam waist images 124-1 and 128-1 are formed on the photosensitive regions 120-1 and 120-2 in equal amounts. Therefore, no focusing signal is generated from the comparator 88 connected with these photosensitive regions 120-1 and 120-2, as shown in FIG. 17. At the defocusing state shown in FIG. 14B, the first projected pattern 124-2 is formed on the photosensitive region 120-1, and the second projected pattern 128-2 is formed on the photosensitive region 120-2. As the first projected pattern 124-2 formed on the photosensitive region 120-1 has a lower intensity of illumination than the second projected pattern 124-1 formed on the photosensitive region 120-2, the signal sent from the photosensitive region 120-1 has a higher level than the signal sent from the photosensitive region 120-2. Therefore, the focusing signal is generated from the comparator 88 shown in FIG. 17, and the objective lens 42 is moved toward the light reflecting layer 14. Further, at the defocusing state shown in FIG. 14E, a signal having a greater level compared with the signal from the photosensitive region 120-1 is generated from the photosensitive region 120-2. Therefore, the focusing signal is generated from the comparator 88 shown in FIG. 17, and the objective lens 42 is moved toward the light-reflecting layer 14.

Figure 14B:
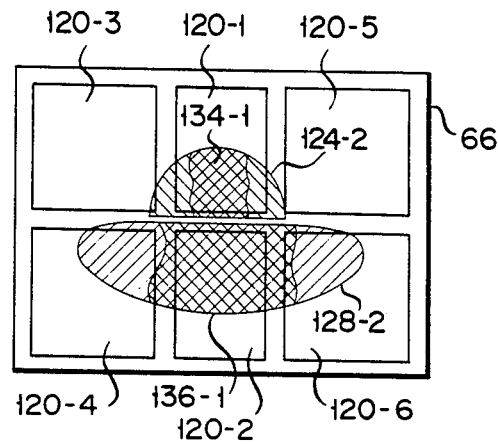
Figure 14C:
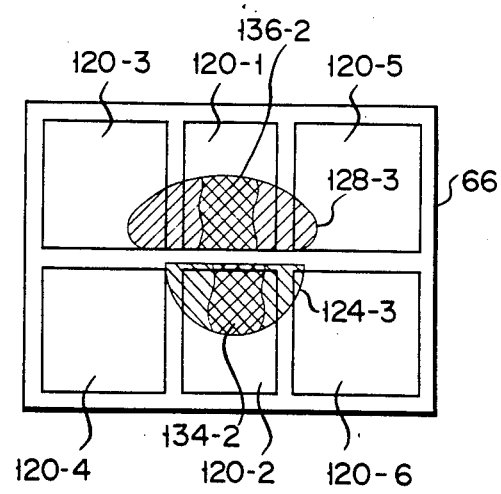
Figure 14D:
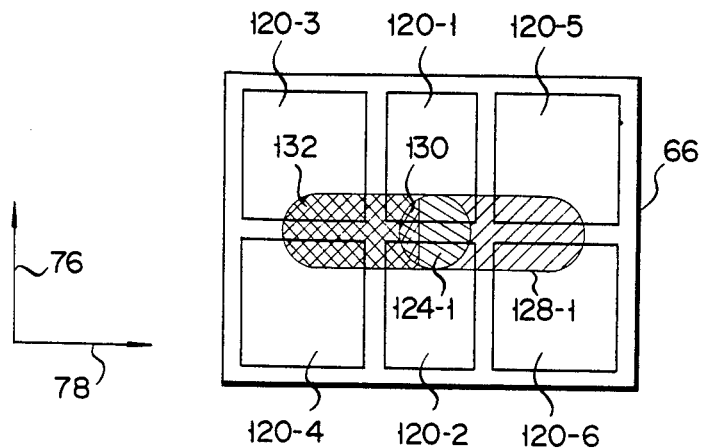
Figure 14E:
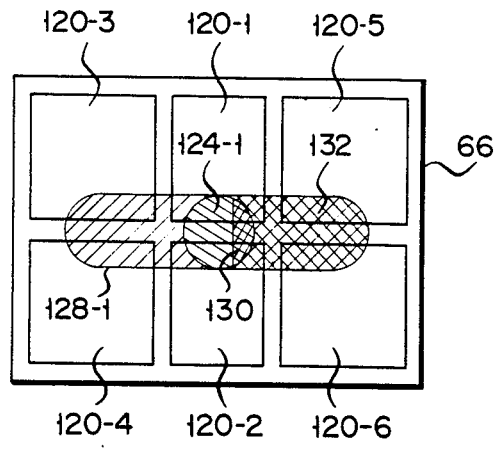
Figure 15A:
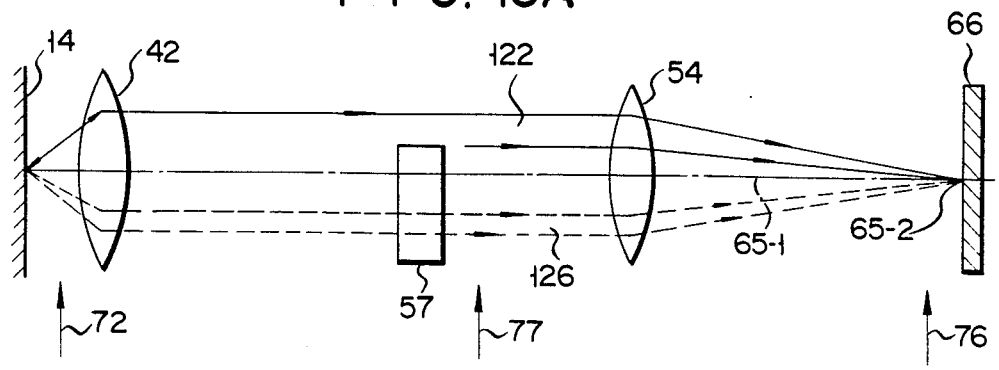
Figure 15B:
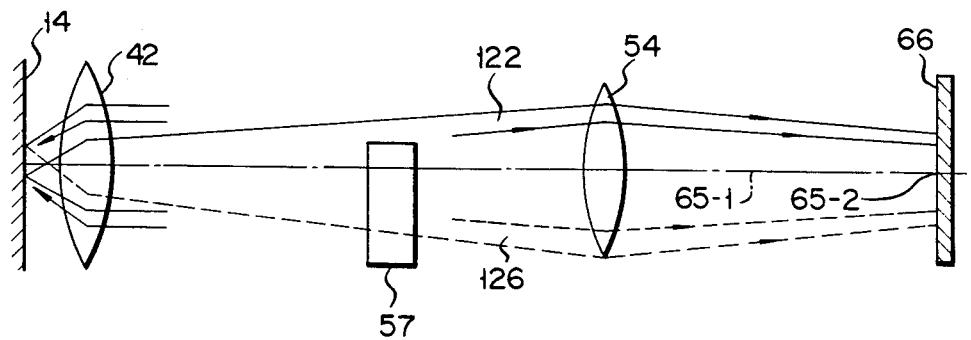
Figure 15C:
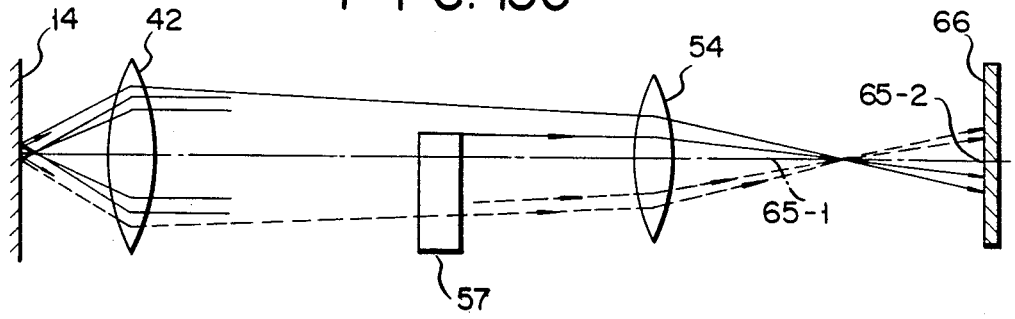

At the just focusing state, the images 130 and 132 of the tracking guide 16, as shown in FIG. 14A, are formed within the first and second beam waist images 124-1 and 128-1 respectively, and at the defocusing state, the diffraction patterns 134-1 and 134-2 and 136-1 and 136-2 of the tracking guide, as shown in FIGS. 14B and 14C respectively, are formed within the projected patterns 124-2 and 124-3, and 128-2 and 128-3, respectively. When the tracking guide 16 is properly traced by the laser beam, the tracking guide images 130 and 132 are the dark central regions of the first and second beam waist images 124-1 and 128-1, as shown in FIG. 14A, and are formed on the photosensitive regions 120-1 and 120-2. Therefore, the level of the signal from the adder 140 (shown in FIG. 17) connected with the photosensitive regions 120-3 and 120-4 is substantially equal to the level of the signal from the adder 140 connected with the photosensitive regions 120-5 and 120-6, and therefore no tracking signal is generated by the comparator 96 connected with the adders 138 and 140. When the beam waist 62 is not properly formed on the tracking guide 16, and the tracking guide images 130 and 132, particularly the tracking guide image 132, are not formed in the center of the beam waist images 128-1 and 124-1, the intensity of illumination of the photosensitive regions 120-5 and 120-6 becomes higher or lower than that of the photosensitive regions 120-3 and 120-4. Therefore, the level of the signal from the adder 138 shown in FIG. 17 becomes higher or lower than the level of the signal from an adder 140, and the tracking signal is generated from the comparator 96. As a result, the galvano mirror 38 is turned at a small angle in the prescribed direction, and the beam waist 62 is moved on the light-reflecting layer 14 in the direction 79 or in an opposite direction thereto and formed properly on the tracking guide 16.

Figure 13:
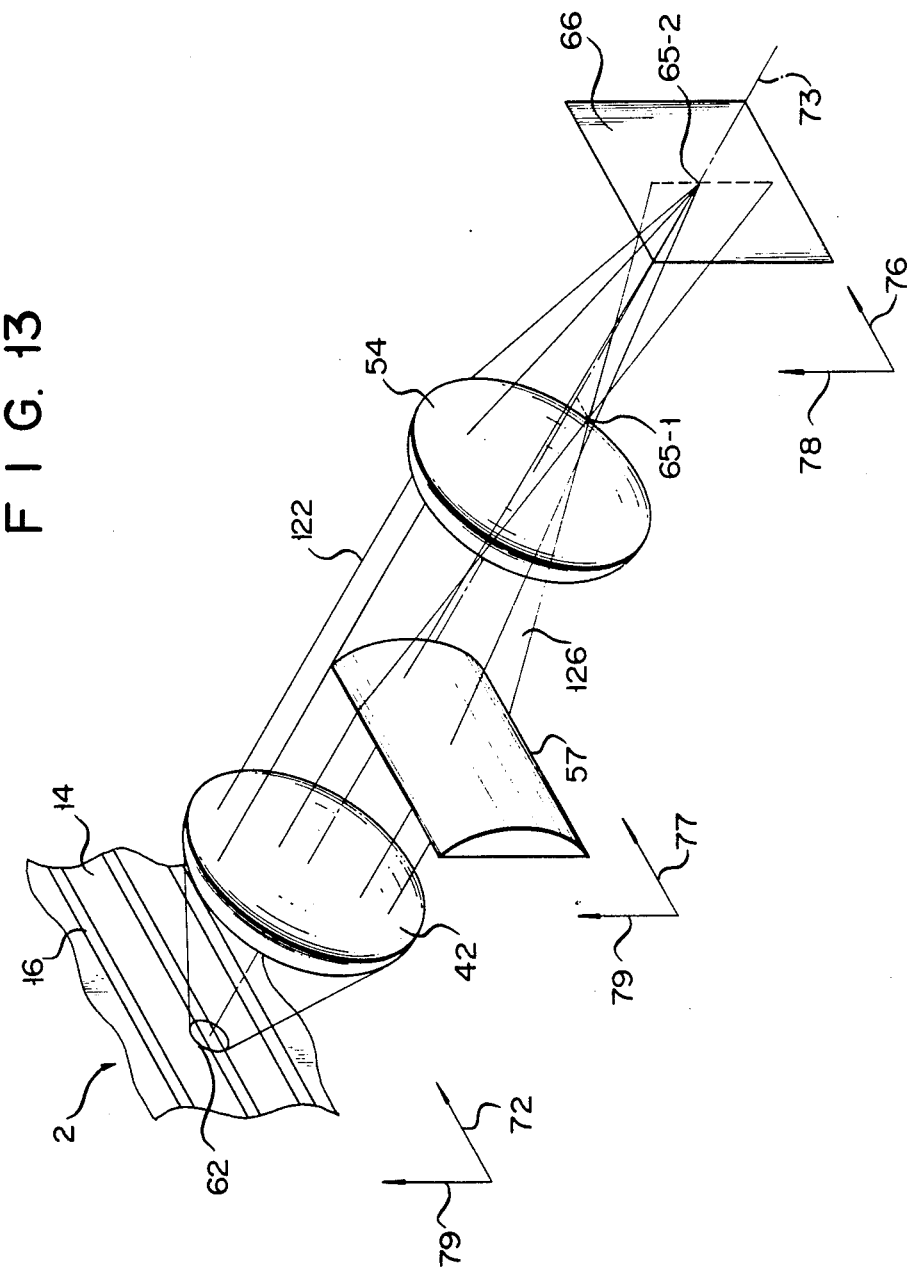
FIG. 13 is a perspective view showing a model of the optical system of the optical head according to another embodiment of the present invention.
Figure 18:
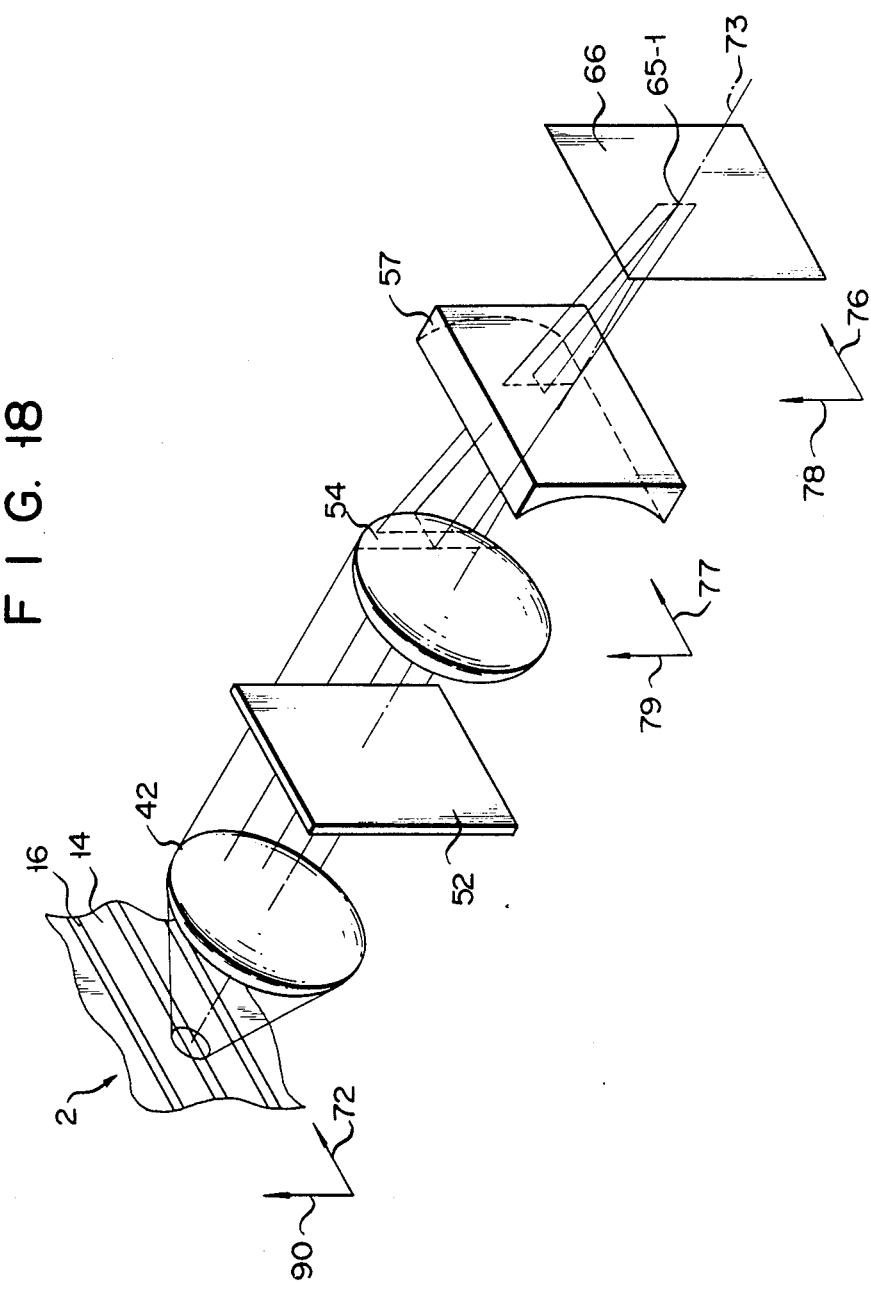
FIGS. 18, 19, 20A, 21 and 22 are schematic views of optical systems according to other embodiments of the invention.

In the embodiments according to this invention shown in FIGS. 2 and 13, a convex lens is used as the cylindrical lens 57, but this cylindrical lens 57 may be a concave lens as shown in FIG. 18. Further, as shown in FIG. 18, a knife edge or a slit may be used in place of the aperture as the light-shielding plate 52. In the optical system having the concave cylindrical lens 57, it is preferably that the light-receiving surface 66 be located at the short focal point 65-1 in order to improve the detection sensitivity.

In the above embodiment, in order to move the pattern of the laser beam projected on the light-receiving surface 66 in accordance with the distance between the objective lens 42 and the light-reflecting layer 14, only the part of the laser beam which passes through that area deviated from the optical axis and extending between the objective lens 42 and the projection lens 54, is picked up by the light-shielding plate 52 or the cylindrical lens 57.

The other typical systems shown in FIGS. 19, 20A, 21, and 22 can change the direction of the laser beam directed from the projection lens 54 to the photodetector 48 in accordance with the distance between the objective lens 42 and the light-reflecting layer 14. In the optical systems shown in FIGS. 19 to 22, the tracking operation can be performed in the same manner as in the optical systems described above, therefore a detailed description thereof will be omitted.

Figure 19:
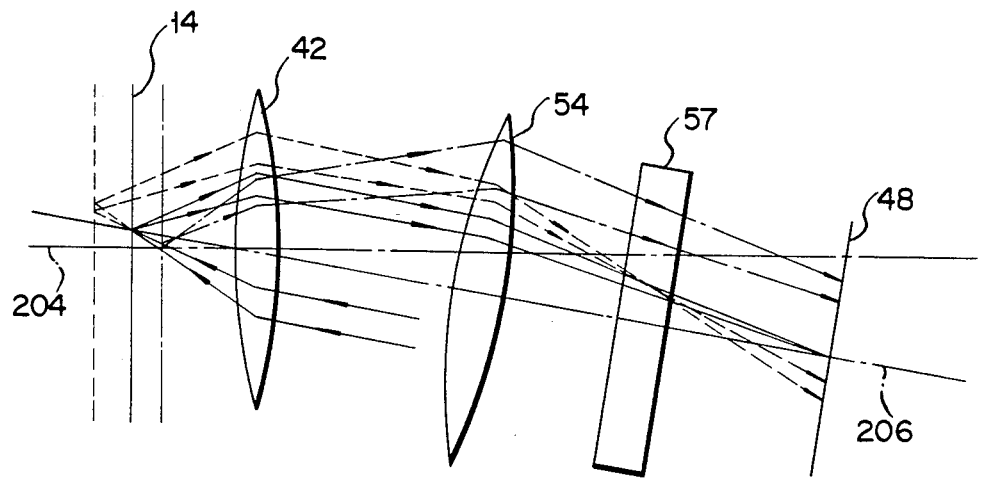

In the optical system shown in FIG. 19, an objective lens 42 and the projection lens 54 are arranged so that an optical axis 204 of the objective lense 42 crosses an optical axis 206 of the projection lens 54. The surface of the light-reflecting layer 14 is perpendicular to the optical axis 204 of the objective lens 42, while the surface of the light-receiving surface 66 of the photodetector 48 is perpendicular to the optical axis 206 of the projection lens 42. The laser beam, with a beam diameter corresponding to the diameter of the objective lens 42, is incident on lens 42 along the optical axis 206 of the projection lens 54. Therefore, if the objective lens 42 is in the just focusing state, the laser beam projected through the objective lens 42 forms the smallest beam spot corresponding to the beam waist on the light-reflecting layer 14. As indicated by the solid lines, the laser beam reflected by the light-reflecting layer 14 is directed toward the objective lens 42. The laser beam transmitted through the objective lens 42 is converted to a parallel laser beam and converged by the cylindrical lens 57 and the projection lens 54. The converted laser beam is then projected on the light-receiving surface 66 positioned on the image-forming plane determined by the objective and projection lenses 42 and 54. Thus, the smallest beam spot image is formed on the light-receiving surface 66. However, if the objective lens 42 is in the defocusing state, the laser beam is guided along the optical path indicated by the broken lines and the alternate long and short dash lines, projected through the projection lens 54 and directed toward the light-receiving surface 66. Therefore, the projected pattern shown in FIGS. 3B and 3C is formed on the light-receiving surface 66.

Figure 20A:
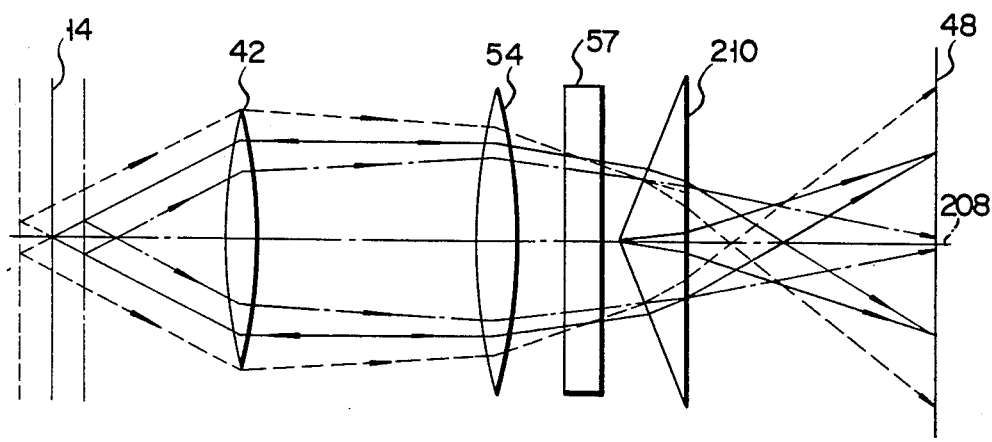
Figure 20B:
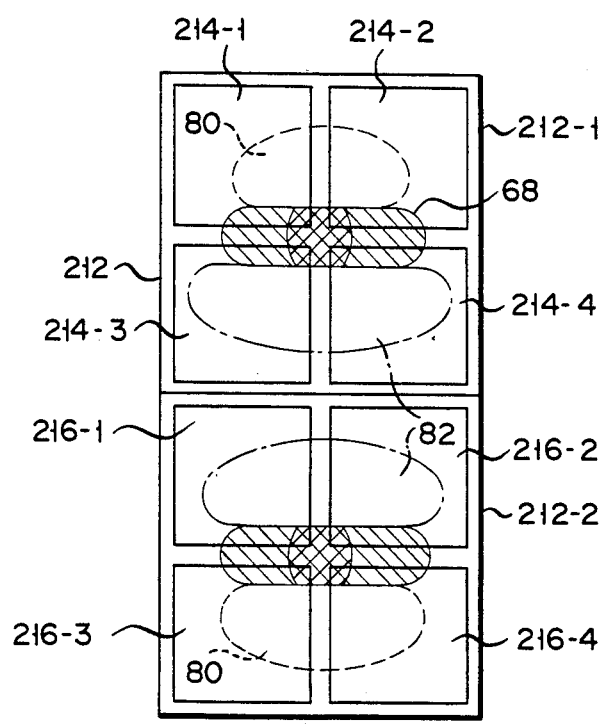
FIG. 20B is a plan view showing a light-receiving surface of a photodetector shown in FIG. 9A.

In the optical system shown in FIG. 20A, the objective lens 42, the projection lens 54 and a Fresnel biprism 210 are arranged along a common optical axis 208. The light-reflecting layer 14 and a light-reflecting surface 212 of the photodetector 48 are perpendicular to the optical axis 208. The light-receiving surface 212 is positioned on the image-forming plane determined by the objective lens 42, the cylindrical lens 57 and the projection lens 54. As shown in FIG. 20B, the light-receiving surface 212 has two surface segments 212-1 and 212-2. The surface segments 212-1 and 212-2 have photosensitive regions 214-1, 214-2, 214-3 and 214-4 and photosensitive regions 216-1, 216-2, 216-3 and 216-4, respectively, in the same manner as the light-receiving surface 66 shown in FIG. 3A. In the optical system shown in FIG. 20A, if the objective lens 2 is in the just focusing state, the laser beam passing through the cylindrical lens 57 is converged by the projection lens 54, as indicated by the solid lines, and is split by the biprism 210. The split laser beams are projected on the light-receiving surface 212. Therefore, as shown in FIG. 20B, the smallest beam spot images 68 are formed on the segment surfaces 212-1 and 212-2 of the light-receiving surface 66, respectively. However, if the objective lens 42 is in the defocusing state, the converged laser beam indicated by the broken lines, or the diverged laser beam indicated by the alternate long and short dashed lines is incident on the projection lens 54. The converged laser beam is converged by the cylindrical lens 57 and the projection lens 54, so that the beam waist thereof is formed between the biprism 210 and the light-receiving surface 212. As a result, a pair of projected patterns 80 which are spaced apart are formed on the light-receiving surface 212, as indicated by the broken lines. On the other hand, the diverged laser beams are converted to a converged laser beam by the cylindrical lens 57 and the projection lens 54. In this case, the beam waist is not formed between the biprism 210 and the light-receiving surface 212 and the laser beams are projected on the light-receiving surface 212. Therefore, a pair of projected patterns 82 which are close together as indicated by the alternate long and short dash lines are formed on the light-receiving surface 212, as shown in FIG. 20B.

Figure 21:
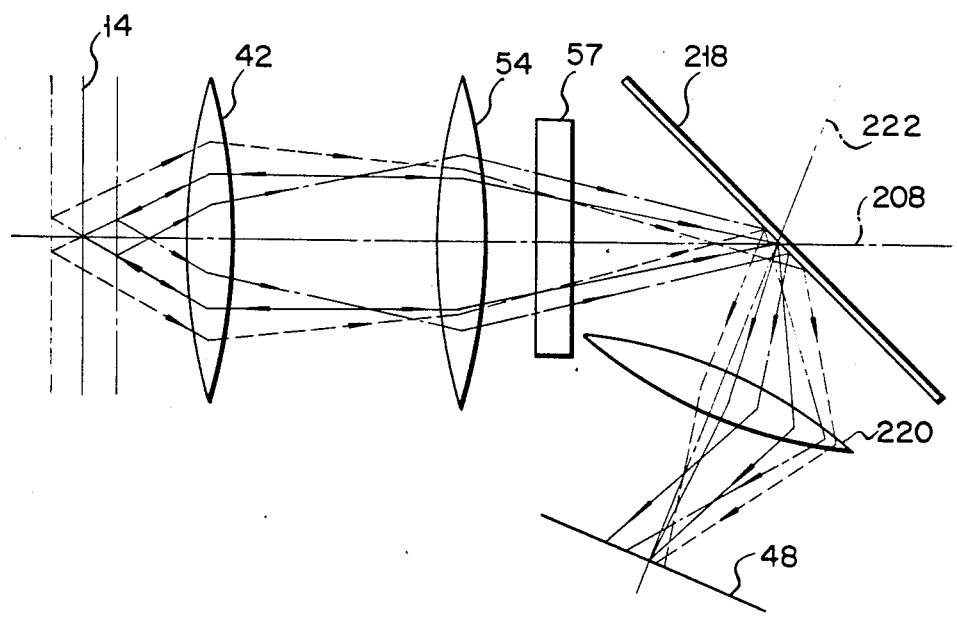

In the optical system shown in FIG. 21, a mirror 218 is arranged on the common optical axis 208 of the objective, cylindrical and projection lenses 42, 57 and 54. The convergent lens 220, having an optical axis 222, is arranged between the mirror 218 and the light-receiving surface 66 of the photodetector 48. The mirror 218 is arranged on the image-forming point determined by the objective lens 42 and the projection lens 54 and the light-receiving surface of the photodetector arranged on the optical axis 222. If the objective lens 42 is in the just focusing state, the laser beam passes through the optical path indicated by the solid lines and the smallest beam spot image is formed on the mirror 218. The smallest beam spot image on the mirror is transferred by the convergent lens 220 to the light-receiving surface 66. However, if the objective lens 42 is in the defocusing state, a converged laser beam is indicated by the broken lines or a diverged laser beam is indicated by the alternate long and short dashed lines incident on the cylindrical lens 57 and the projection lens 54 in the same manner as in the previous embodiments. These laser beams are converged by the projection lens 54 and the laser beams reflected from the mirror 218 are directed to the convergent lens 220. However, when these laser beams reflected from the mirror 218 are converged by the convergent lens 220, projection patterns shown in FIGS. 3B and 3C are formed on the light-receiving surface 66 due to different travelling directions, respectively.

Figure 22:
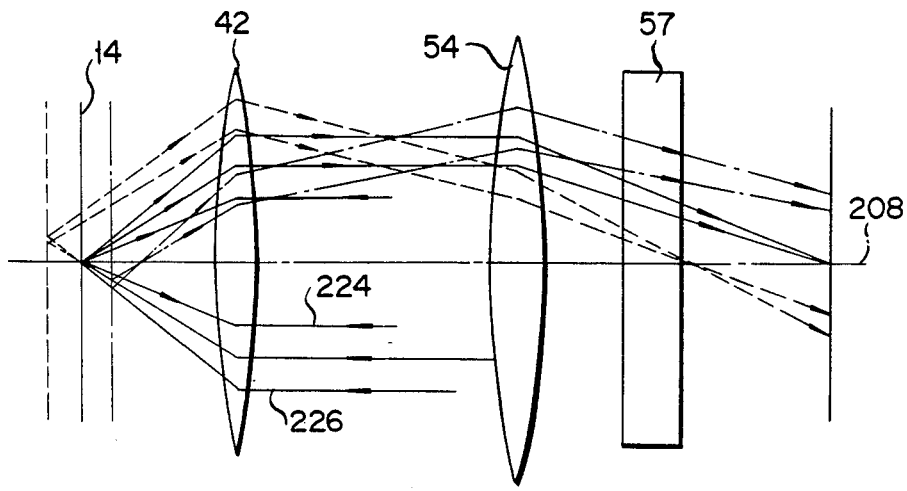
Figure 23:
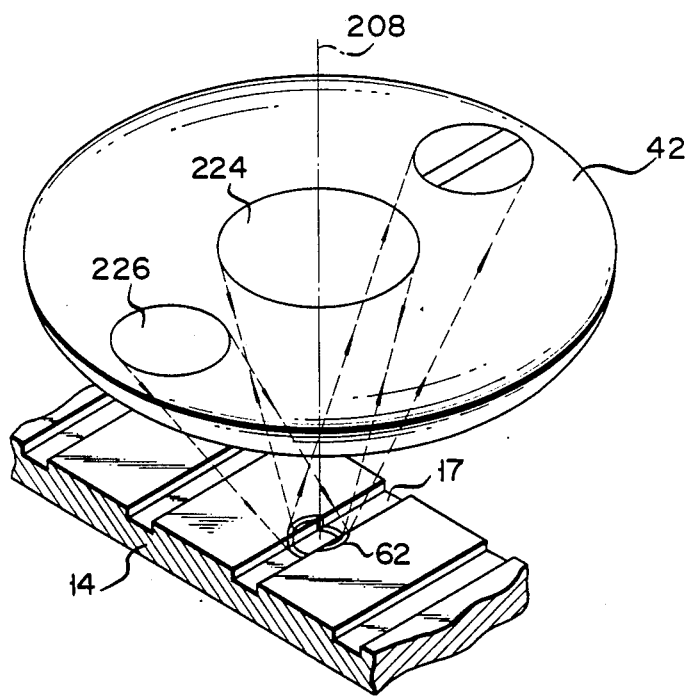
FIG. 23 is a perspective view of laser beam paths and a laser beam spot in the optical system shown in FIG. 22.

In the optical system shown in FIGS. 22 and 23, the objective and projection lenses 42 and 54 are arranged on the common optical axis 208. In the optical system shown in FIGS. 22 and 23, first and second laser beams 224, 226 are incident on the objective lens 42. The first laser beam 224, for recording and reproducing the information, is transmitted along the optical axis 208 and the second laser beam 226, for focusing and tracking the laser beam 224, is transmitted along an optical path which is remite from and is parallel with the optical axis 208. On the light-reflecting layer 14, two beam spots are formed by the two beams as shown in FIG. 23. When the objective lens 42 is in the just focusing state, the smallest beam spots 62 corresponding to the beam waists of the two laser beams 224, 226 are formed on the light-reflecting layer 14. Therefore, the first and second laser beams 224, 226 form the images of the smallest beam spots on the center region of the light-receiving surface 66 of the photodetector 48, only the first laser beam being indicated by the solid line in FIG. 22. When the objective lens 42 is in the defocusing state, the beam spots which are larger than the smallest beam spots 62 are formed on the light-receiving surface 66. The first laser beam 224 forms the projected pattern on the center region of the light-receiving surface 66, but the second laser beam 226, passing through the optical paths indicated by the broken line or the alternate long and short dash line in FIG. 22, is deviated on the light-receiving surface 66 and forms the projected pattern on the upper or lower regions of the light-receiving surface 66. Therefore, the optical system shown in FIGS. 22 and 23 can detect the focusing state of the objective lens. In FIG. 23, the tracking guide 17 is formed as a recess on the light reflecting layer instead of the projected tracking guide 16 discussed earlier.

In the embodiments shown in FIGS. 17, 20, 21, 22 and 23 the laser beams travelling toward the objective lens 42 are parallel laser beams. However, converged or diverged laser beams may be used to detect the focusing state of the objective lens in the same manner as in the optical system indicated in FIG. 1.

The above descriptions have been given in connection with the embodiment in which the optical disk is equipped with a tracking guide and the tracking guide image is formed on the light-receiving surface of the photodetector. In this connection it is to be noted that, even if the optical disk is not equipped with the tracking guide, an image corresponding to the tracking guide image is formed on the light-receiving surface. That is, when the optical disk is rotated at high speeds, information pits formed on the light-reflecting layer of the optical disk describe a circular pattern on the disk which is similar to the pattern of the tracking guide, permitting a corresponding image to be formed on the light-receiving surface. It is to be noted in this connection that in this specification the circular pattern corresponding to the information pits is treated as the tracking guide.

According to this invention, during the just focusing state of the objective lens, the light-reflecting layer of the optical disk and the light-receiving surface of the photodetector are located at the objective point and image-forming point as determined by the objective lens, cylindrical lens and projection lens, respectively, permitting an image of a minimum beam spot corresponding to a beam waist to be formed on the light-receiving surface. Even if the light-reflecting layer of the optical disk is inclined and thus ceases to be in an orthogonal relation to the optical axis of an objective lens, a decision can be made as to whether or not the objective lens is exactly in the just focusing state without causing the beam spot image to be displaced on the light-receiving surface. Even when dirt or a defect is present on the laser beam path of the optical system, a beam spot image is formed on the image-forming point during the just focusing state of the objective lens without involving any displacement of the beam spot image by the dirt or defect. Where the light-shielding plate is arranged in a Fourier transform plane as defined by the projection lens, no pattern on the light beam transmitting area on the light-shielding plate emerges on the light-receiving surface during the just focusing state of the objective lens, permitting the just focusing state to be accurately detected.

Further, when the objective lens is at the just focusing state, the beam spot image formed on the light-receiving surface of the photodetector is in an elongated elliptical shape, and when the beam waist traverses the tracking guide, the tracking guide image moves within this elongated beam spot image. This serves to determine whether the beam waist is properly formed on the tracking guide. On the other hand, this elongated beam waist image at the just focusing state changes into a comparatively large elliptical projected pattern at the defocusing state, and this pattern is formed apart from the center of the light-receiving surface of the photodetector. This serves to accurately detect the defocusing state. Further, since the direction in which this pattern is moved from the center of the light-receiving surface is almost perpendicular to the direction in which the tracking guide image moves within the beam spot image, the follow-up of the tracking guide and detection of the just focusing state can accurately be made by a single photodetector.

While the invention has been described in connection with what is presently considered to be the most practical and preferred embodiments, it is understood that the invention is not to be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

What is claimed is:

1. An optical system for controlling a light beam which is directed onto a light reflecting surface having a tracking guide, comprising:

means for generating a light beam;

objective lens means for converging said light beam into a converged light beam having a beam waist, and for directing said converged light beam onto said light reflecting surface to produce a beam spot on said tracking guide, said objective lens means being in focus when said beam spot is substantially equal in size to said beam waist and being out of focus when said beam spot is larger than said beam waist, and for directing light reflected from said light reflecting surface, said directed light having a beam spot image and diffraction patterns which result from light reflected from said tracking guide;

means for transferring and deflecting said directed light;

astigmation lens means for reconverging said directed light received from said transferring and deflecting means; and photodetecting means for receiving the reconverged light and detecting the focus and tracking state of said converged light beam on said tracking guide, said photodetecting means being positioned substantially on a plane where the beam spot image in said reconverged light is in focus, said photodetecting means including an arrangement having a plurality of photosensitive regions disposed to cause: (1) the beam spot in at least a portion of said reconverged light to fall substantially equally on two of said regions when said converged light beam is in focus on said tracking guide, (2) said beam spot in at least a portion of said reconverged light to fall predominantly into at least one of said photosensitive regions when said converged light beam is out of focus, (3) the diffraction patterns in at least a portion of said reconverged light to fall on said photodetecting means substantially in the center of said light beam in at least a portion of said reconverged light beam when said converged light beam is properly tracking said guide, and (4) said diffraction patterns in at least a portion of said reconverged light to fall off center in said beam spot in at least a portion of said reconverged light beam when said converged light beam is not properly tracking said tracking guide.

2. An optical system for controlling a light beam which is directed onto a light reflecting surface having a tracking guide, comprising:

means for generating a light beam;

objective lens means for converging said light beam into a converged light beam having a beam waist, and for directing said converged light beam onto said light reflecting surface to produce a beam spot on said tracking guide, said objective lens means being in focus when said beam spot is substantially equal in size to said beam waist and being out of focus when said beam spot is larger than said beam waist, and for directing light reflected from said light reflecting surface, said directed light having an optical path and containing a beam spot image with diffraction patterns which are caused by light reflected from said tracking guide;

refractor means, positioned in said directed light optical path to cause a first portion of said directed light to pass through said refractor means while a second portion of said directed light bypasses said refractor means, for refracting said first portion to produce refracted light;

projection lens means for reconverging said refracted light and said second portion of said directed light; and photodetecting means for receiving the reconverged light and detecting the focus and tracking state of said converged light beam on said tracking guide, said photodetecting means including photosensitive regions to cause: (1) said refracted light and said second portion of said directed light to fall substantially symmetrically with respect to a first boundary between at least two of said regions when said converged beam is in focus on said tracking guide, (2) said refracted light and said second portion to fall predominantly asymmetrically with respect to said first boundary when said converged light beam is out of focus, (3) said diffraction patterns to fall symmetrically with respect to a second boundary between at least two of said regions when said converged light beam is properly tracking said tracking guide, and (4) said diffraction patterns to fall assymetrically with respect to said second boundary when said tracking is improper.

* * * * *